| United States Patent [19] | [11] Patent Number: 5,140,871 |
|---|---|
| Goto et al. | [45] Date of Patent: Aug. 25, 1992 |

[54] AUTOMATIC TRANSMISSION

[75] Inventors: Shigeki Goto, Kariya; Masato Shimei; Tetsuhiro Miyazawa, both of Nagoya; Yoshitami Saitou, Aichi, all of Japan

[73] Assignee: Aisin Seiki Kabushiki Kaisha, Kariya, Japan

[21] Appl. No.: 679,091

[22] Filed: Apr. 2, 1991

[30] Foreign Application Priority Data

Apr. 2, 1990 [JP] Japan .................................. 2-88056

[51] Int. Cl.⁵ ............................................ B60K 41/10
[52] U.S. Cl. ..................................... 74/866; 364/424.1
[58] Field of Search ......................... 74/866, 867, 868; 364/424.1

[56] References Cited

U.S. PATENT DOCUMENTS

| 4,324,156 | 4/1982 | Iwanaga et al. | 74/867 X |
| 4,690,017 | 9/1987 | Taniguchi et al. | 74/866 |
| 4,693,143 | 9/1987 | Harada et al. | 74/866 |
| 4,708,032 | 11/1987 | Harada et al. | 74/866 |
| 4,722,247 | 2/1988 | Shindo et al. | 74/866 |
| 4,771,386 | 9/1988 | Yasue et al. | 74/866 X |
| 4,776,240 | 10/1988 | Miki | 74/866 X |
| 4,789,937 | 12/1988 | Yasue et al. | 74/866 X |
| 4,945,482 | 7/1990 | Nishikawa et al. | 74/866 X |
| 4,984,483 | 1/1991 | Hiramatsu et al. | 74/866 |
| 5,014,576 | 5/1991 | Yamaguchi | 74/866 |

FOREIGN PATENT DOCUMENTS

| 61-55451 | 3/1986 | Japan . |
| 61-99750 | 5/1986 | Japan . |
| 61-149657 | 7/1986 | Japan . |

*Primary Examiner*—Richard Lorence
*Assistant Examiner*—William O. Trousdell
*Attorney, Agent, or Firm*—Burns, Doane, Swecker & Mathis

[57] ABSTRACT

An apparatus and method for synchronizing shifting of a main transmission and a subtransmission, particularly in automatic transmissions having more than four speed ranges. Synchronism is achieved by initiating the shifting of the main transmission when the speeds of the input and output shafts of the main transmission achieve a predetermined relationship.

3 Claims, 34 Drawing Sheets

Fig. 3

| | clutches | | | brakes | | | 1/2 shift SL1 | | 2/3 shift SL2 | | 3/4 shift SL3 | | gear ratio |
|---|---|---|---|---|---|---|---|---|---|---|---|---|---|
| | $C_0$ | $C_1$ | $C_2$ | $B_0$ | $B_1$ | $B_2$ | normally closed | | normally open | | normally open | | |
| P | ○ | × | × | × | × | × | ○ | open | ○ | close | × | open | — |
| R | ○ | × | ○ | × | × | ○ | ○ | open | × | open | × | open | 2.678 |
| N | ○ | × | × | × | × | × | ○ | open | ○ | close | × | open | — |
| D 1 | ○ | ○ | × | × | × | × | × | close | ○ | close | × | open | 2.950 |
| D 2 | × | ○ | × | × | × | × | ○ | open | ○ | close | × | open | 1.530 |
| D 3 | ○ | ○ | ○ | × | × | × | × | close | × | open | × | open | 1.000 |
| D O/D | × | ○ | ○ | ○ | × | × | × | close | × | open | ○ | close | 0.765 |
| S 1 | ○ | ○ | × | × | × | × | ○ | close | ○ | close | × | open | 2.950 |
| S 2 | ○ | ○ | × | × | ○ | × | × | open | ○ | close | × | open | 1.530 |
| L 1 | ○ | ○ | × | × | × | ○ | × | close | ○ | close | × | open | 2.950 |
| L LS | × | ○ | × | ○ | × | ○ | × | close | ○ | close | ○ | close | 2.257 |

○: engaged ×: disengaged ○: energized ×: deenergized

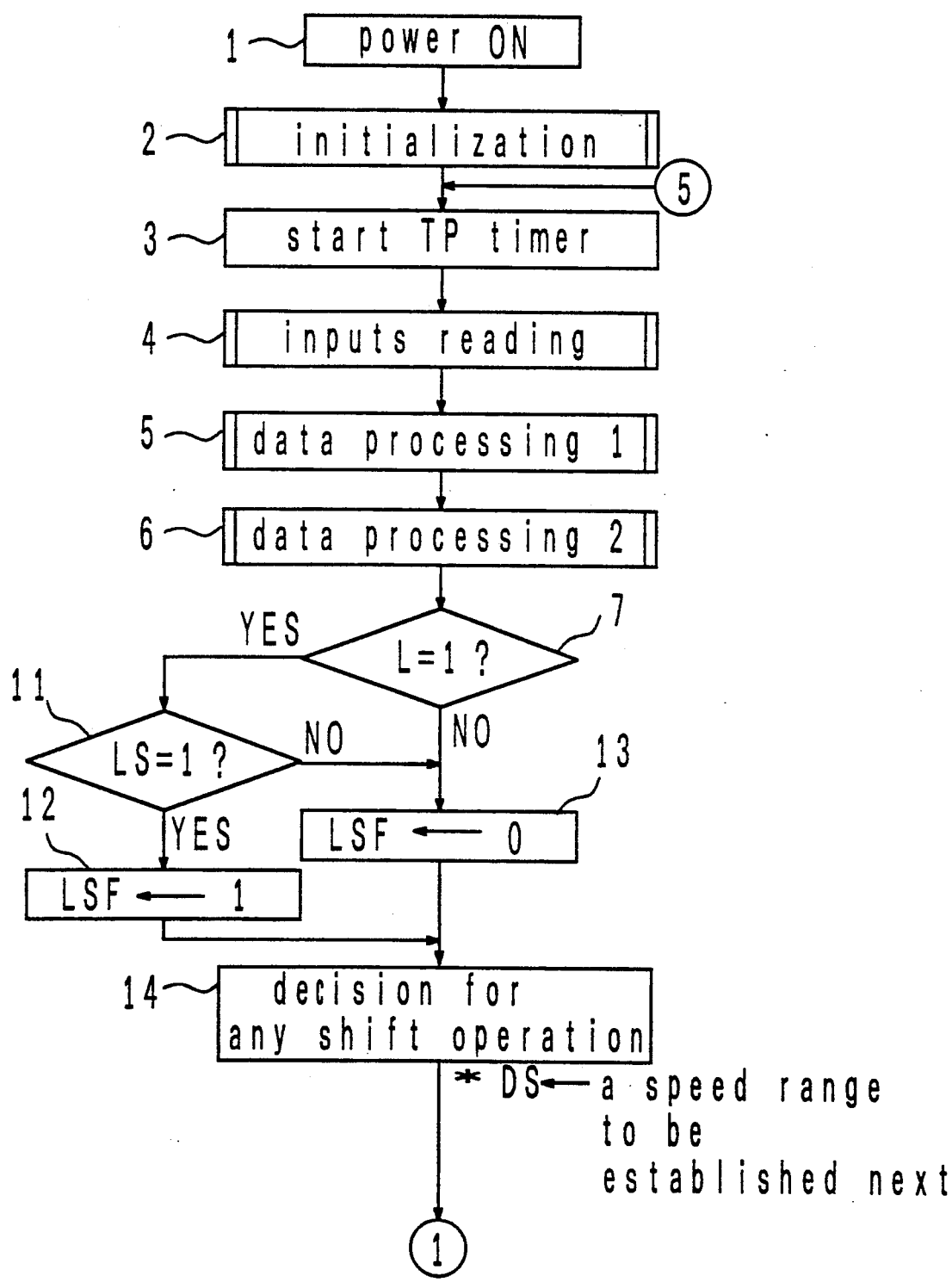

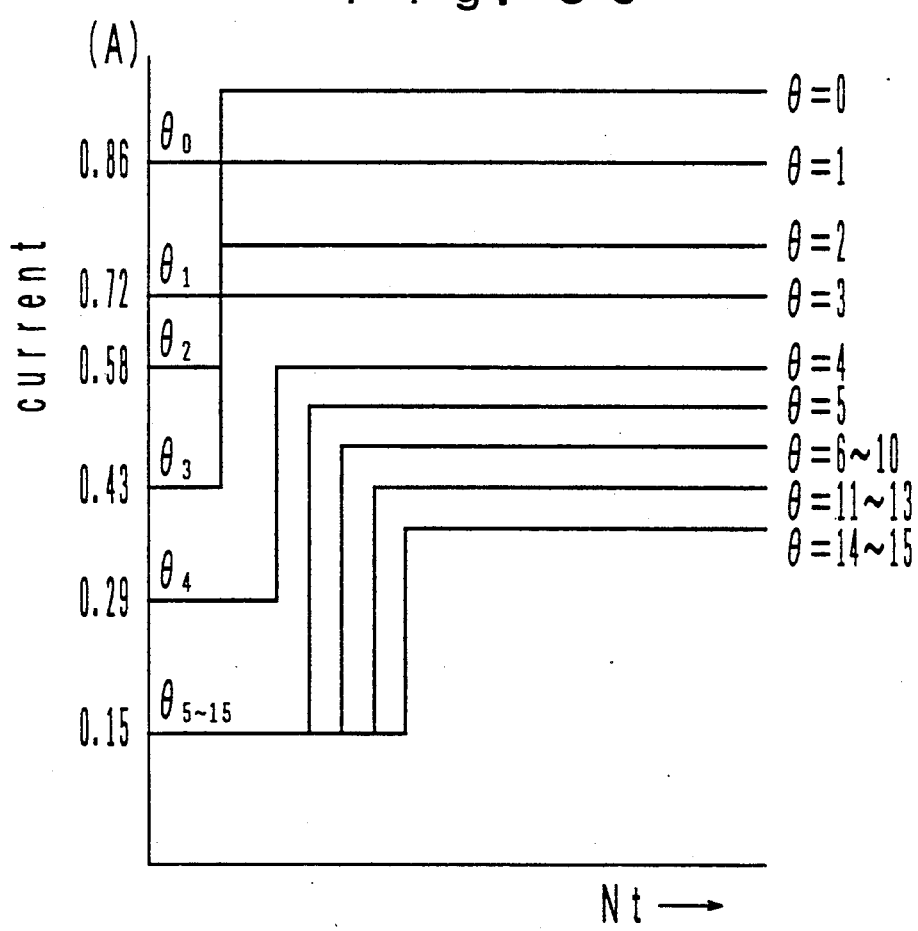

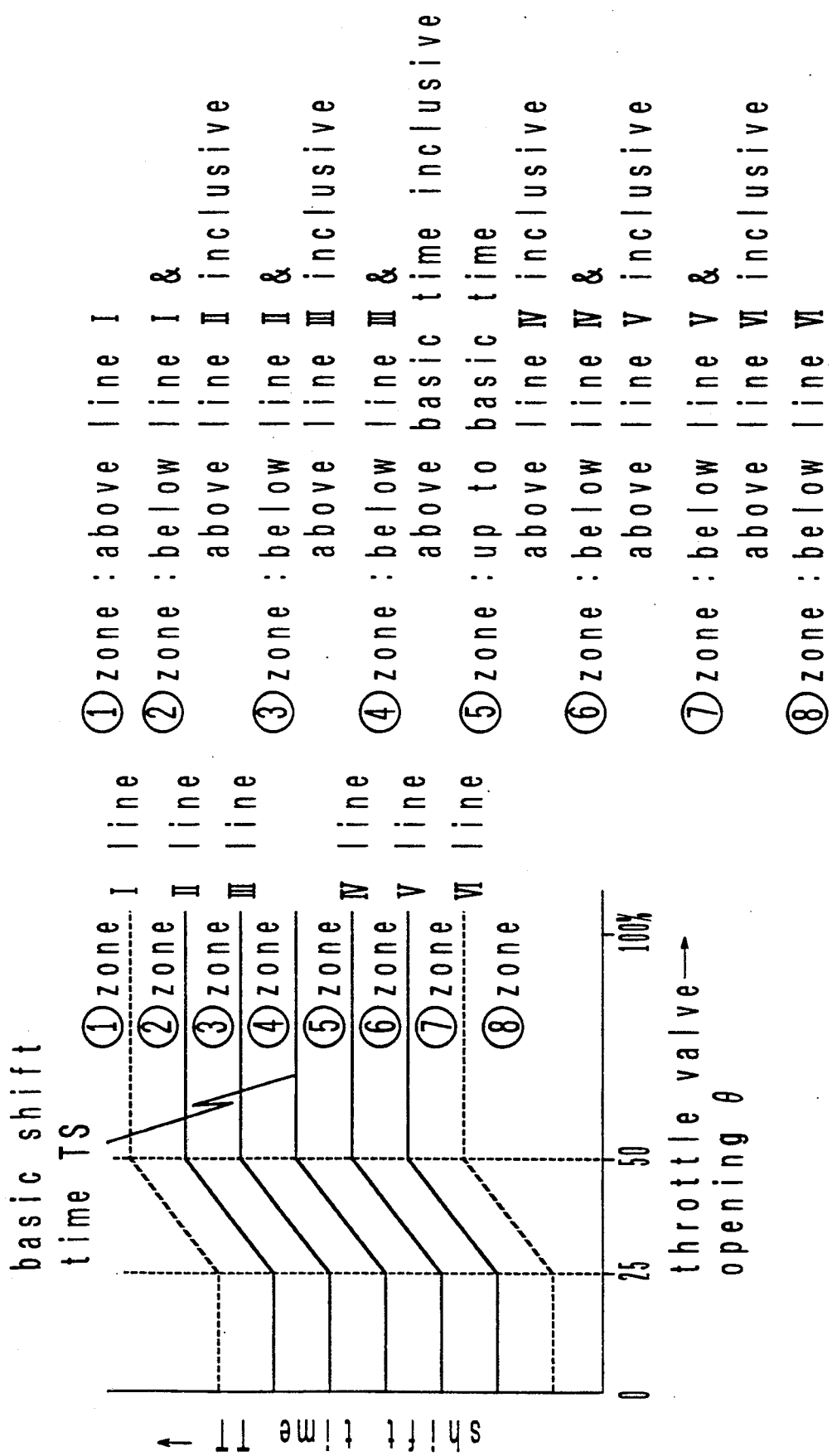

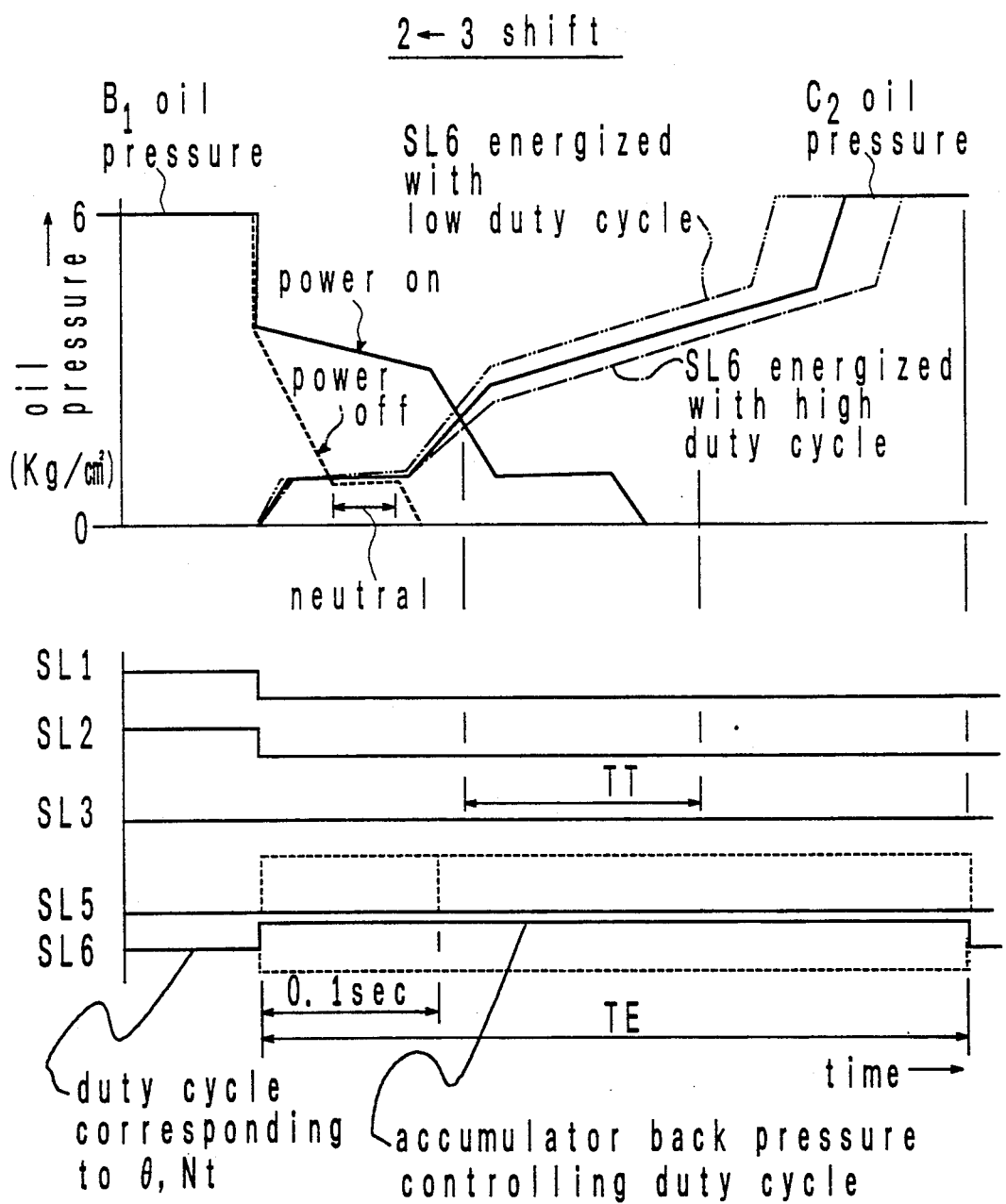

1→1.5 shift

1.5→2 shift

※ point X : $\Delta N \leq Gmap$

4→1.5 shift

Fig. 13a

*Gmap values

| No (rpm) \ θ (%) | θ<25 | 25≦θ<50 | 50≦θ<75 | 75≦θ≦100 |
|---|---|---|---|---|
| No<400 | 300 | 300 | 300 | 300 |
| 400≦No<800 | 300 | 300 | 300 | 300 |
| 800≦No<1200 | 550 | 550 | 550 | 550 |
| 1200≦No<1600 | 800 | 800 | 800 | 800 |
| 1600≦No<2000 | 1000 | 1000 | 1000 | 1000 |
| 2000≦No | 1000 | 1000 | 1000 | 1000 |

1.5→2 shift

Fig. 13c

| No | No at point A ×1.53 | $C_1$ revolutions at commencement of shift operation | $C_1$ revolutions at point B | shift time TT | decrease in $C_1$ revolutions per 0.1 sec | $C_1$ revolutions at point C | ΔN | Gmap |
|---|---|---|---|---|---|---|---|---|
| less than 800 | 612 | 1180 | 800 | 0.3 | 127 | 927 | 315 | 300 |
| 800~1200 | 1224 | 2360 | 1600 | 0.4 | 190 | 1790 | 566 | 550 |
| 1200~1600 | 1836 | 3540 | 2400 | 0.45 | 253 | 2653 | 817 | 800 |
| 1600 and higher | 2448 | 4720 | 3200 | 0.45 | 338 | 3538 | 1090 | 1000 | power mode economy mode

AUTOMATIC TRANSMISSION

FIELD OF THE INVENTION

The invention relates to an automatic transmission for transmitting a torque from an output shaft of an engine to a load driving shaft and for automatically changing a gear ratio or a ratio of the rotational speed of the output shaft of the engine with respect to the rotational speed of the load driving shaft, and in particular, an automatic transmission mounted onboard a vehicle in which a driving torque from the engine is transmitted to wheel driving shaft through a torque converter, a subtransmission and a main transmission.

PRIOR ART

A typical automatic transmission of the kind described comprises a torque converter having an input shaft which is coupled to the output shaft of an engine; a subtransmission having an input shaft coupled to the output shaft of the torque converter for achieving a shift between a gear ratio in a first range (the ratio of the rotational speed of input shaft/the rotational speed of output shaft which may be 1.000, for example) and a lower gear ratio in a conditional range (for example, 0.756: overdrive O/D); a main transmission having an input shaft coupled to the output shaft of the subtransmission for achieving a shift to a gear ratio in a first, a second or a third speed range (for example, 2.950, 1.530 and 1.000); a hydraulic circuit including a manual valve having an L position where a gear ratio from the input shaft of the subtransmission to the output shaft of the main transmission is fixed to only the gear ratio in the first speed range, an S position for establishing a gear ratio in the first or the second speed range and a D position for establishing a gear ratio in the first, the second, the third or a fourth (which may be referred to as O/D; the gear ratio may be equal to 0.756, for example), a single solenoid operated valve representing a first set which establishes a gear ratio of the subtransmission, and a plurality of solenoid operated valves representing a second set for establishing a gear ratio of the main transmission, the hydraulic circuit supplying oil pressures to the subtransmission and the main transmission for establishing a gear ratio which is determined by a combination of the position of the manual valve and the open/closed condition of the valve in the first set and the valves in the second set; a shift lever position sensor for detecting the established position of the manual valve; and gear ratio control means (recently formed by a microcomputer) for establishing a gear ratio in the first range in the subtransmission and a gear ratio in the first speed range in the main transmission when the sensor detects the L position, for establishing a gear ratio in the first range in the subtransmission and a gear ratio in the first or the second speed range in the main transmission when the sensor detects the S position, and for establishing a gear ratio in the first range in the subtransmission and a gear ratio in the first, the second or the third speed range in the main transmission or alternatively a gear ratio O/D: 0.76) in the second range in the subtransmission and a gear ratio in the third speed range (1.000) in the main transmission when the sensor detects D position.

Thus the described automatic transmission establishes gear ratios in four speed ranges, specifically, the first, the second, the third and the fourth (O/D) speed range. To increase the number of ranges, proposals have been made recently (see Japanese Laid-Open Patent Applications No. 55,451/1986, No. 99,750/1986 and No. 149,657/1986) in which when the fourth speed (O/D) is set up. In addition, the second range is established in the subtransmission in combination with the first speed range established in the main transmission to provide a gear ratio between those of the first and the second speed range (2.950×0.765=2.257: which is referred to as 1.5 speed range) or in combination with the second speed range established in the main transmission to provide a different gear ratio intermediate those of the second and the third speed range (1.530×0.765=1.170) which may be referred to as 2.5 speed range, thus making gear ratios in a total of six ranges to be available.

In an automatic transmission which permits the 1.5 speed range to be established, it is necessary to change the main transmission from the first to the second speed range and to change the subtransmission from the gear ratio in the second range (O/D) to the gear ratio in the first range (termination of O/D) during a shift from the 1.5 to the second speed range. Shift shocks may be developed during a 1→2 shift in the main transmission, and since a shift in the subtransmission is added thereto, the prior art has exercised a complicate control in preventing the occurrence of shift shocks. For example, in the shift control disclosed in Japanese Laid-Open Patent Application No. 99,750/1986, a shift of the subtransmission takes place in the course of a shift of the main transmission in order to prevent shift shocks from occurring in two phases. In order to determine the timing when the subtransmission is changed, an oil pressure of a brake used in the main transmission is detected by a pressure detecting switch. In addition, a release control valve is added for gradually releasing a brake pressure from the main transmission in order to prevent the occurrence of shift shocks. This changes a hydraulic circuit and increases elements required in controlling the shift operation.

SUMMARY OF THE INVENTION

It is an object of the invention to provide a smooth 1.5→2 shift without requiring additional elements in the hydraulic circuit.

An automatic transmission according to the invention comprises a torque converter (1) having an input shaft coupled to the output shaft (8) of an engine; a first transmission (2) having an input shaft coupled to the output shaft (9) of the torque converter (1) for performing a shift to at least a gear ratio (rotational speed of input shaft /rotational speed of output shaft) in a first range (a low rotational speed of the output shaft) and a lower gear ratio in a second range (a high rotational speed of the output shaft); a second transmission (3) having an input shaft coupled to the output shaft of the first transmission (2) for performing a shift to a gear ratio in at least in a first range (first speed range) and a second range (a second speed range); a hydraulic circuit (FIG. 2) including a solenoid operated valve (SL3) in a first set for establishing a gear ratio of the first transmission (2) and solenoid operated valves (SL1, SL2) in a second set for establishing a gear ratio in the second transmission (3) in order to establish a gear ratio in the first transmission (2) and the second transmission (3) which is determined by a combination of the open/closed conditions of the solenoid valve SL3 in the first set and the solenoid valves (SL1, SL2) in the second set; opening detecting means (138) for detecting the opening of a throttle valve of the engine; detecting means (142) for detecting the rotational speed of the output shaft (39) of the second transmission (3); detecting means (141) for detecting the rotational speed of the input shaft (23) of the second transmission (3); and gear ratio control means (130) operable during a shift (1.5→2) from a speed range (a 1.5 speed range) in which a gear ratio in the second range (the high rotational speed of the output shaft) is established in the first transmission (2) and a gear ratio in the first range (first speed range) is established in the second transmission to a different condition in which a gear ratio in the first range (low rotational speed of the output shaft) is established in the first transmission (2) and a gear ratio in the second range (the second speed range) is established in the second transmission (3) for activating the solenoid valve (SL3) in the first set to establish the first range (low rotational speed of the output shaft) in the first transmission (2) after a gear ratio in the second range (the second speed range) is established in the second transmission (3) by the solenoid operated valves (SL1, SL2) in the second set, at a time when a deviation ($\Delta N = Nt - No \times 1.53$) of the rotational speed (No) of the output shaft (39) of the second transmission (3) multiplied by the gear ratio (1.53) in the second range (the second speed range) of the second transmission (3) from the rotational speed (Nt) of the input shaft (23) of the second transmission (3) becomes equal to or less than a given value (Gmap: FIG. 13a) determined by the rotational speed (No) of the output shaft (39) of the second transmission (3) and the throttle valve opening ($\theta$) (point X in FIG. 12b).

It is to be understood that reference numerals and characters appearing in parentheses refer to corresponding elements or events shown in the drawings and described later in connection with an embodiment.

After gear ratio in the second range (the second speed range) is established in the second transmission (3) by the solenoid valve (SL1, SL2) in the second set, the rotational speed (No) of the output shaft (39) of the second transmission (3) multiplied by the gear ratio (1.53) in the second range (the second speed range) of the second transmission (3) produces a deviation ($\Delta N = Nt - No \times 1.53$) which corresponds to the degree of matching of the rotational speeds of the input shaft (23) and output shaft (39) of the second transmission (3), which in turn depends on the rotational speed (No) of the output shaft (39) of the second transmission (3) and the throttle valve opening ($\theta$). Accordingly, a given value (Gmap) is set up for the deviation ($\Delta N$) for which the shift operation can be regarded as substantially completed in a manner corresponding to the rotational speed (No) and the opening ($\theta$). When the actual deviation ($\Delta N$) reaches a given value (Gmap), the first transmission (2) is changed so that the completion of the shift in the first transmission is substantially synchronized with the completion of the shift in the second transmission (3). It will be understood that a time delay will be involved between changing the solenoid valve (SL3) in the first set to the completion of the shift operation of the first transmission, so that the given value (Gmap) is chosen to initiate changing the first transmission (2) earlier by an amount corresponding to such time delay.

Since the completion of the shift operation in the second transmission (3) and the first transmission (2) is substantially synchronized in accordance with the invention, a shift operation can be realized substantially free from the occurrence of any shift shock without requiring added elements in the hydraulic circuit.

Other objects and features of the invention will become apparent from the following description of an embodiment thereof with reference to the drawings.

BRIEF DESCRIPTION OF THE DRAWINGS

FIG. 3 is a table representing the relationship between the combinations of energization and deenergization of solenoid valves (SL1 to SL3) used in the hydraulic circuit shown in FIGS. 2a and 2b to determine the speed range and the engagement and disengagement of various brakes and clutches shown in FIG. 1;

FIGS. 5a, 5b, 5c, 5d and 5e are flow charts representing the control operations (main routines) by a microcomputer of a control board 130 shown in FIG. 4;

FIG. 9c graphically shows the current level which is used to energize the linear solenoid valve SL6 and which is determined by the microcomputer in the control board 130 shown in FIG. 4 on the basis of a throttle valve opening $\theta$ and the rotational speed Nt of a drum in a clutch $C_1$;

FIG. 10d graphically shows a relationship between a time reference value TS for a mechanical shift corresponding to the opening $\theta$ of the throttle valve and corresponding regions in which such reference value is used;

Figure 1:
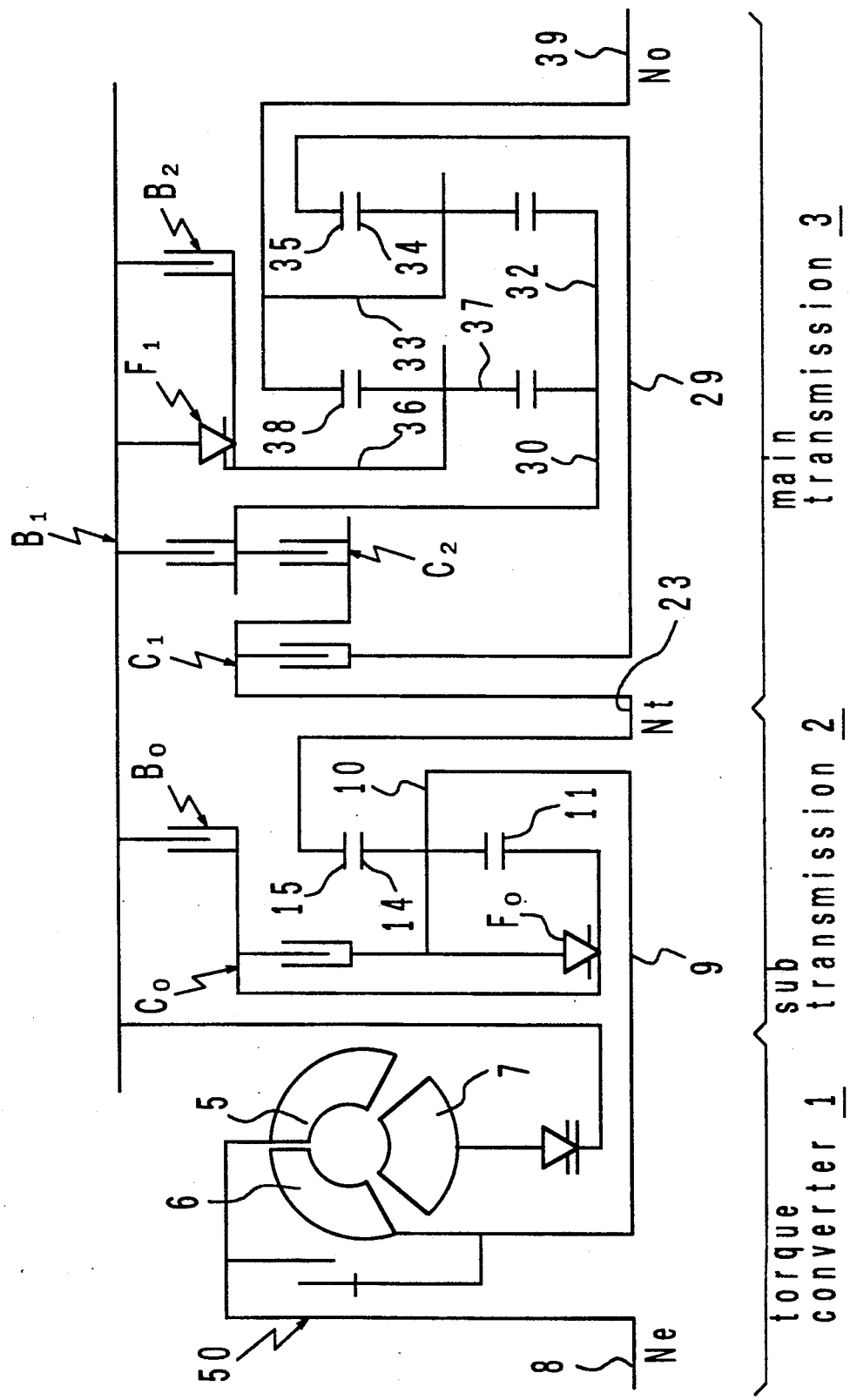
FIG. 1 is a block diagram of a transmission mechanism according to one embodiment of the invention.
Figure 2A:
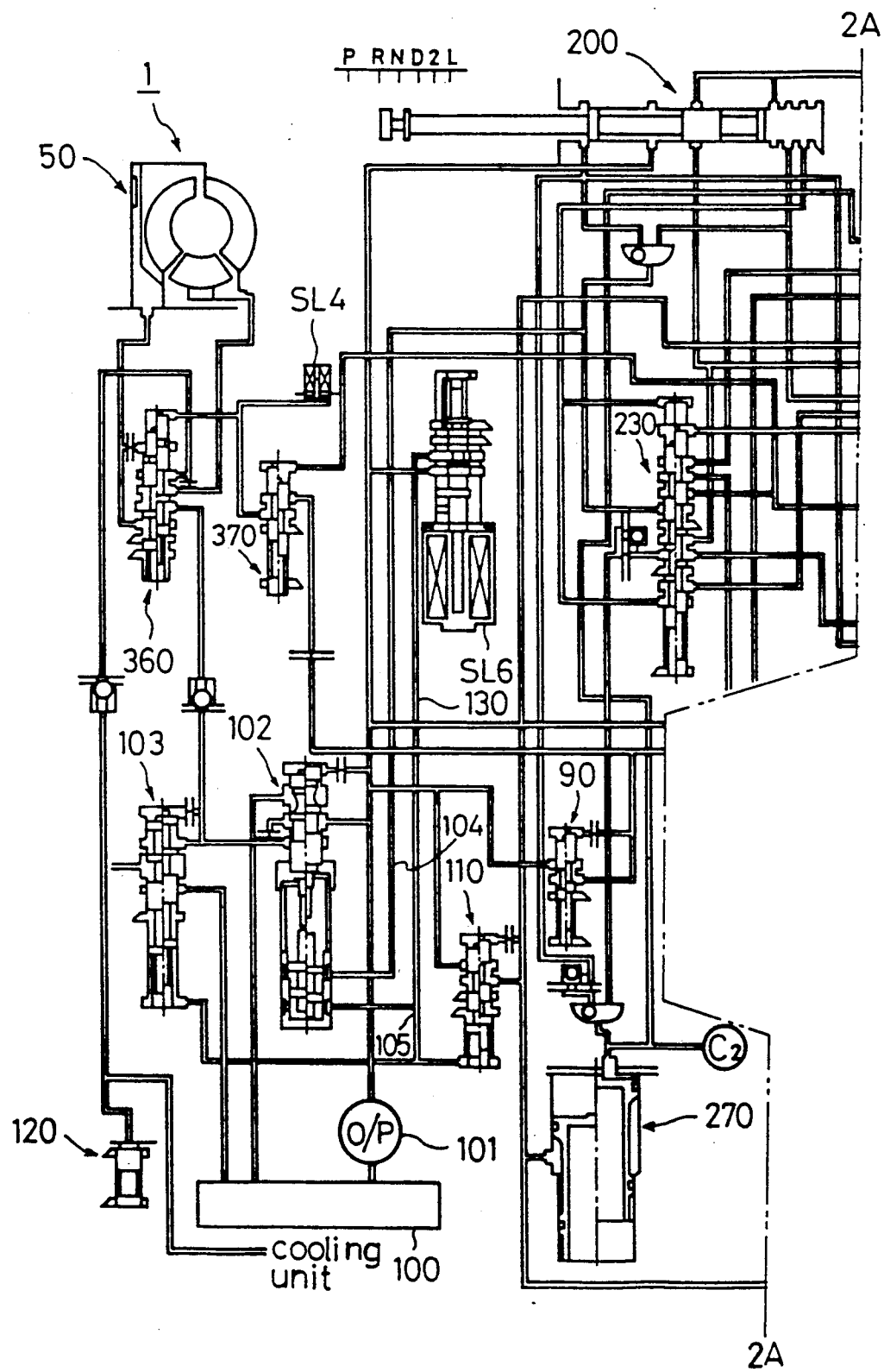
FIGS. 2a and 2b are block diagrams, each showing one-half of a hydraulic circuit which supplies an oil pressure to or removes an oil pressure from various brakes and clutches located within the transmission mechanism shown in FIG. 1, FIGS. 2a and 2b being joined together along IIA—IIA and IIB—IIB lines shown to form one hydraulic circuit.
Figure 2B:
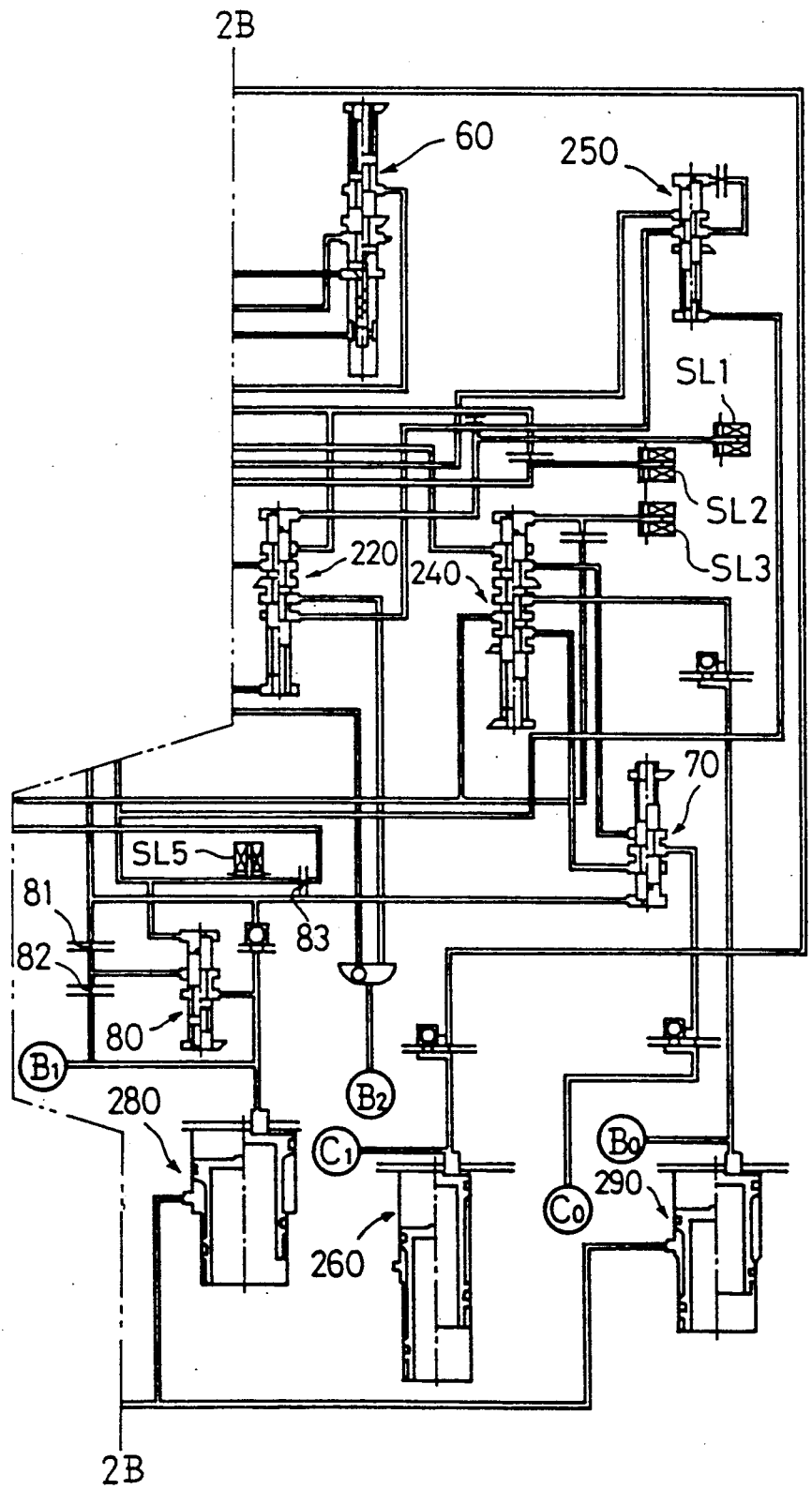
Figure 11B:
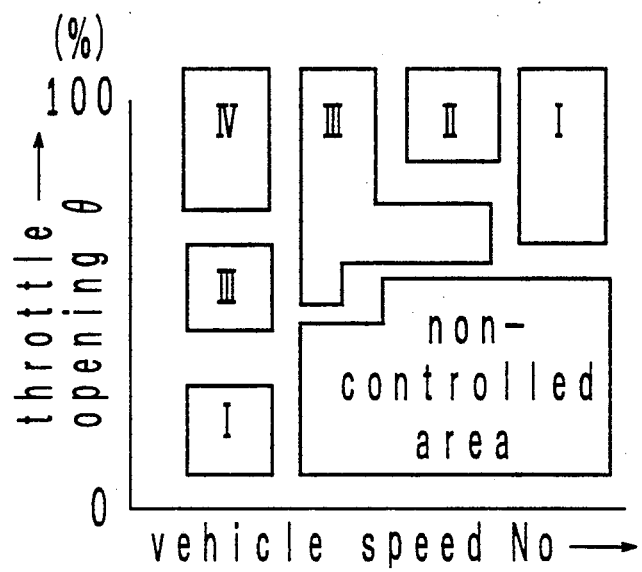
FIG. 11a graphically shows a change in the oil pressure of a brake $B_0$ and a clutch $C_2$ shown in FIG. 1 during a 2→3 shift, the solid line representing a power on shift operation.
Figure 11C:
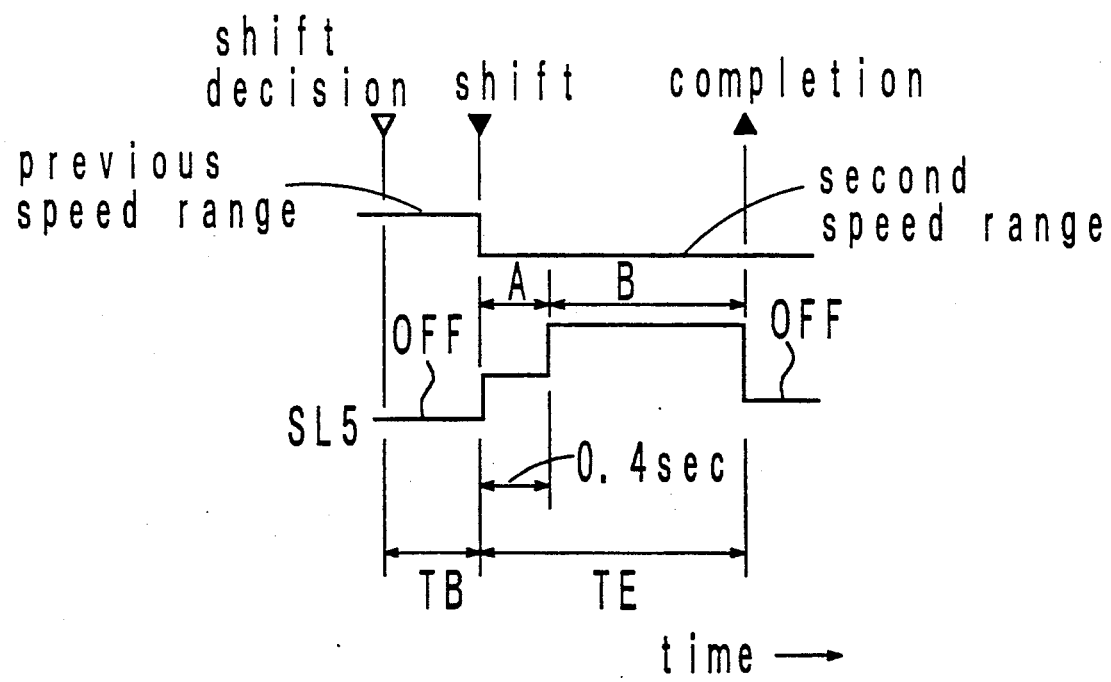
Figure 11D:
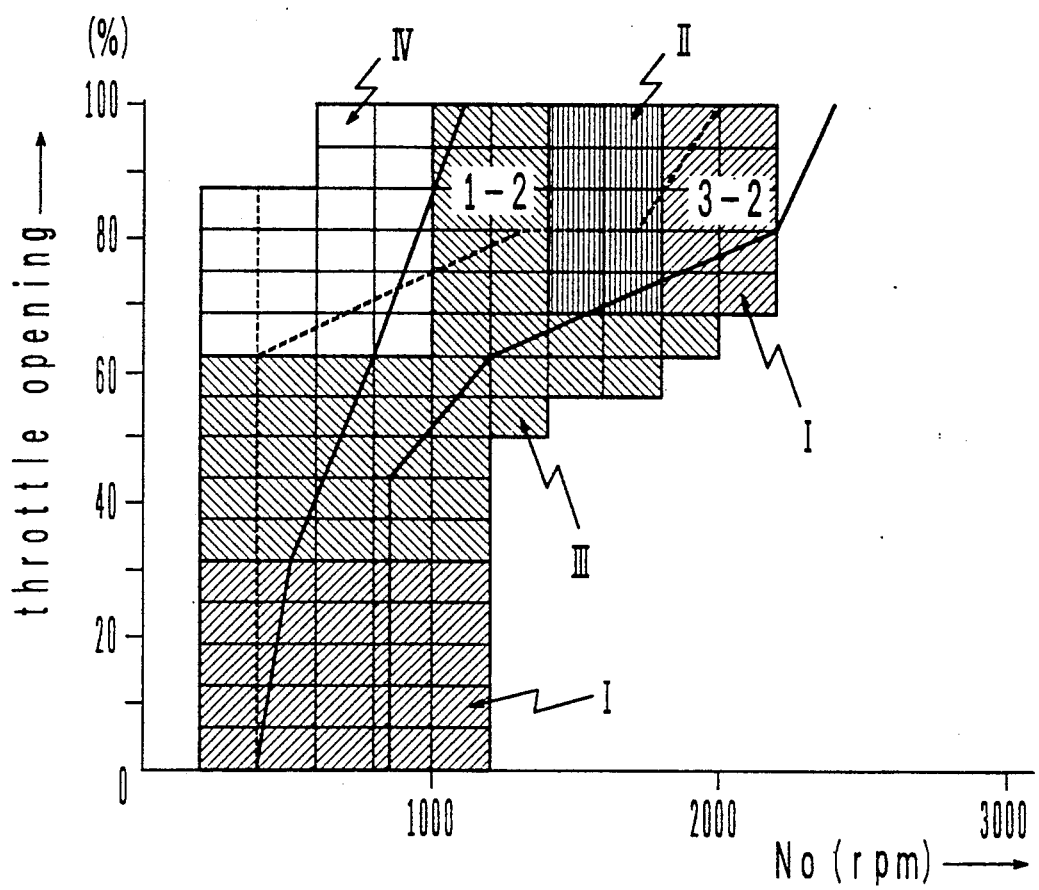
Figure 11E:
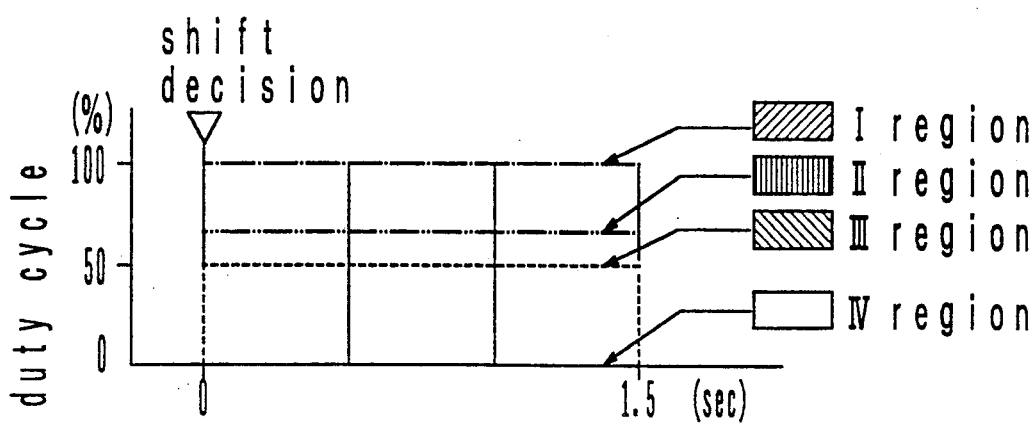
Figure 11F:
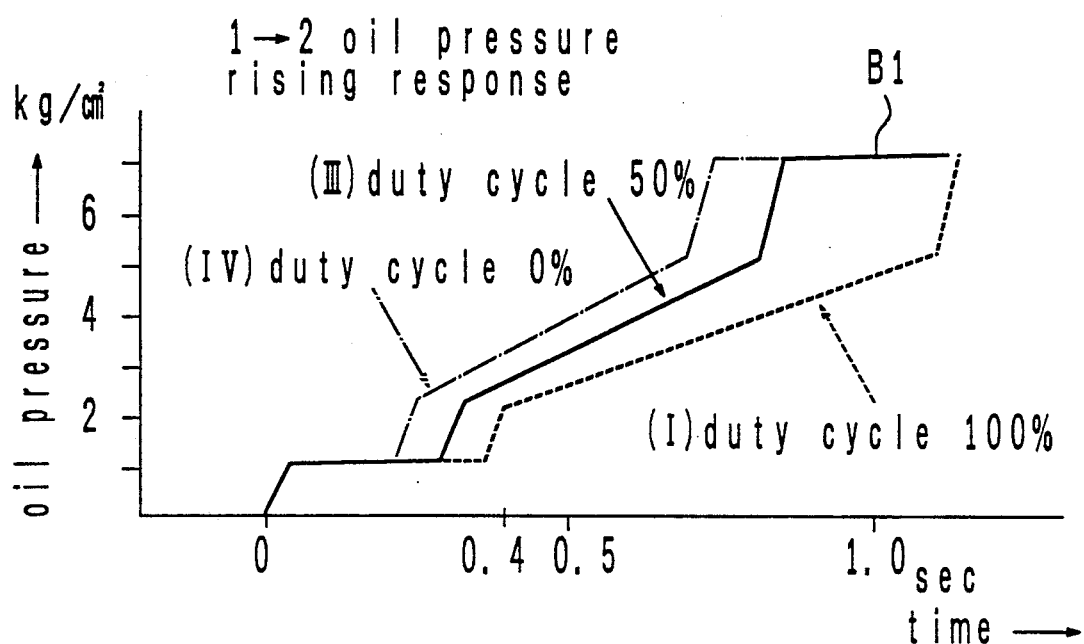
Figure 11G:
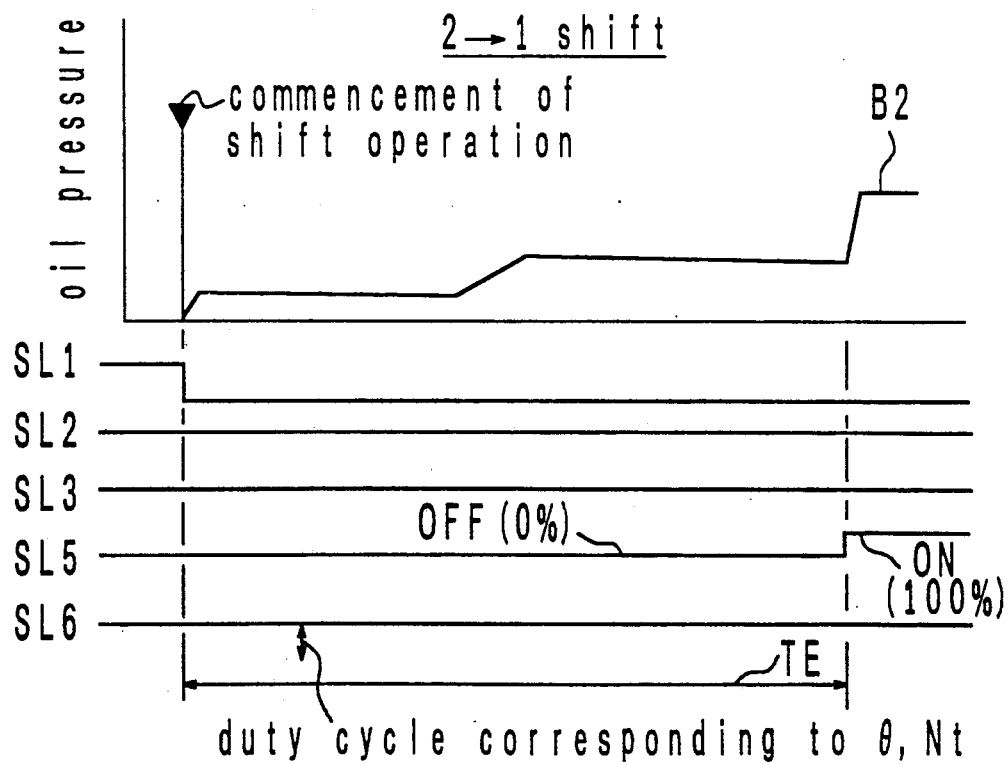
Figure 12A:
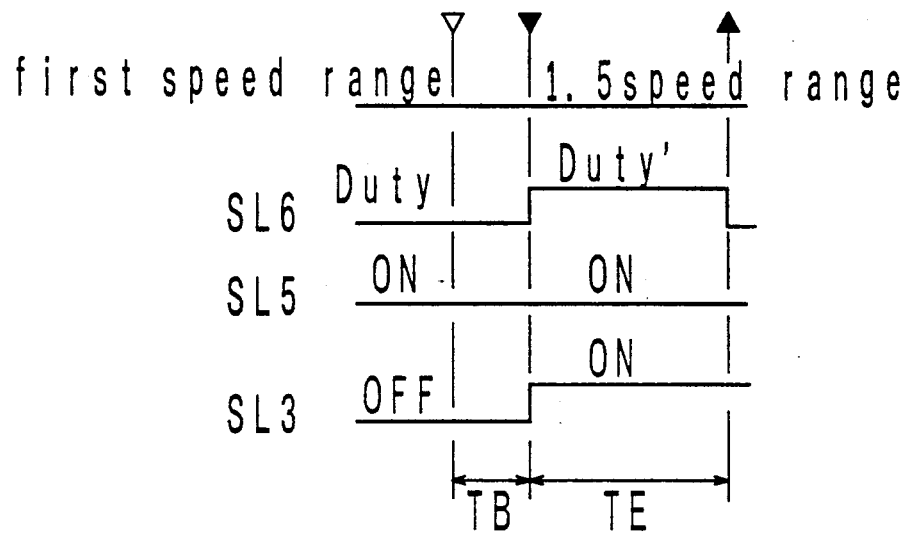
Figure 12B:
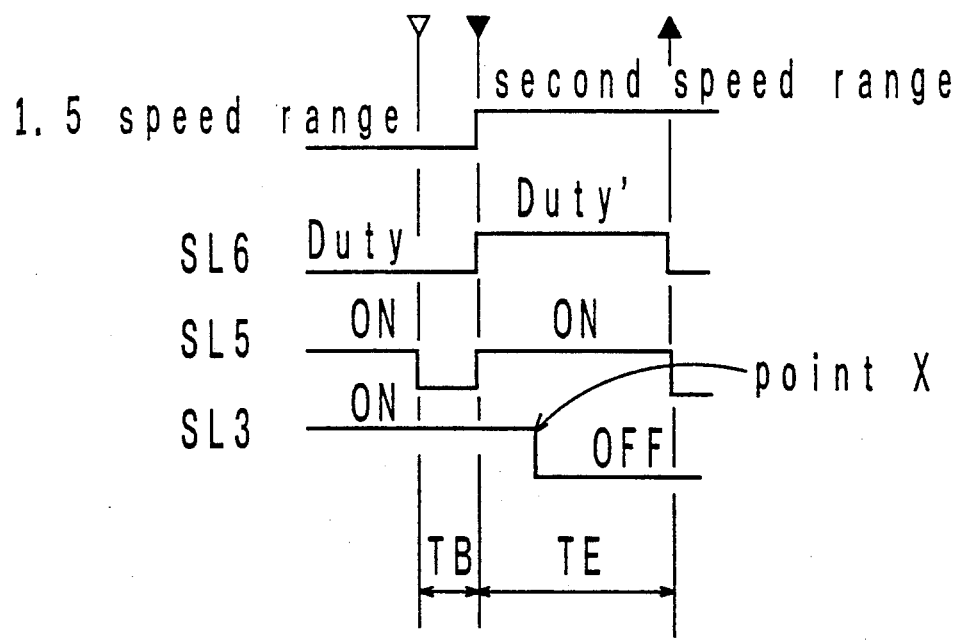
Figure 13B:
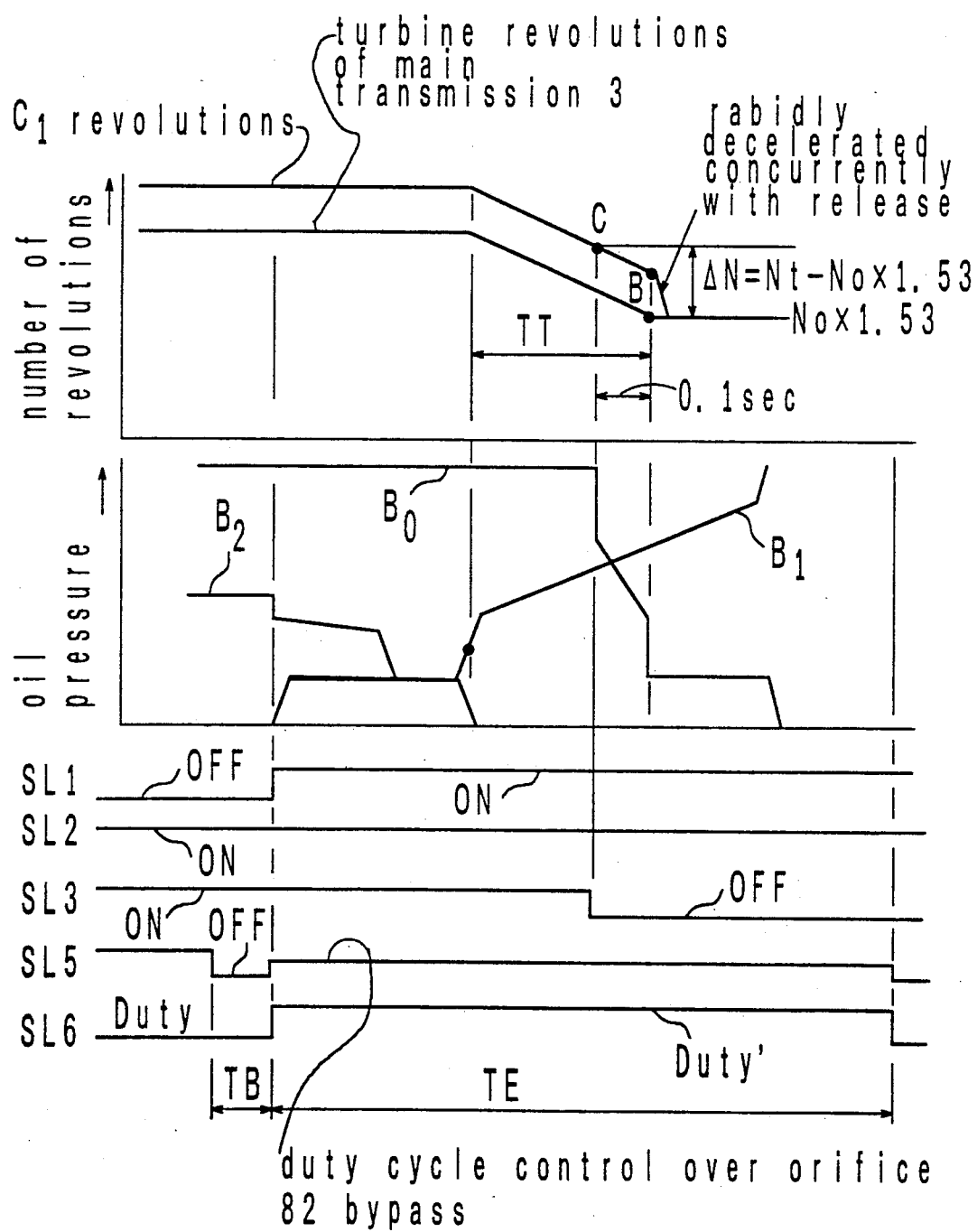
Figure 14A:
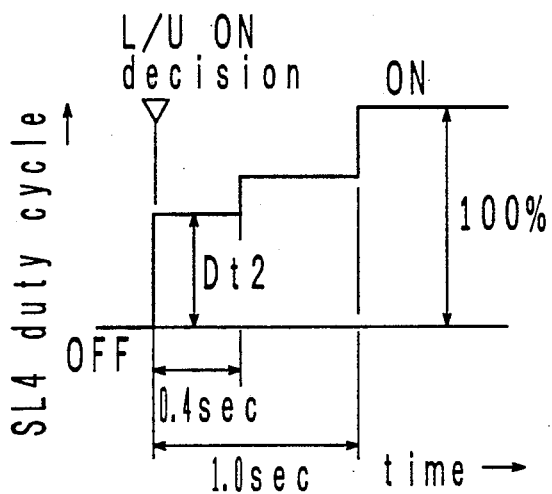
Figure 14B:
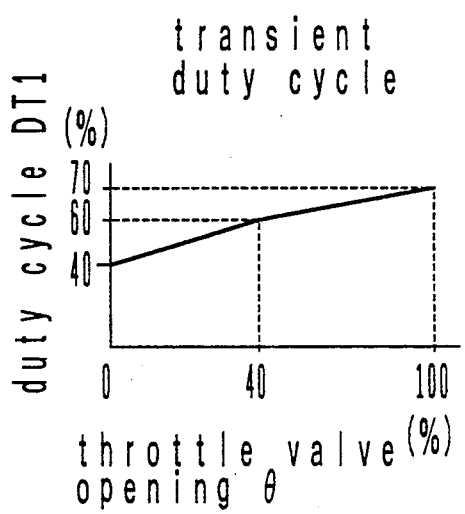
Figure 14C:
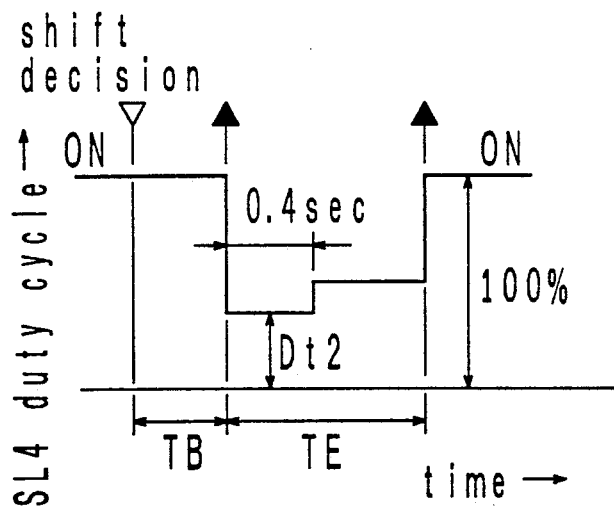
Figure 14D:
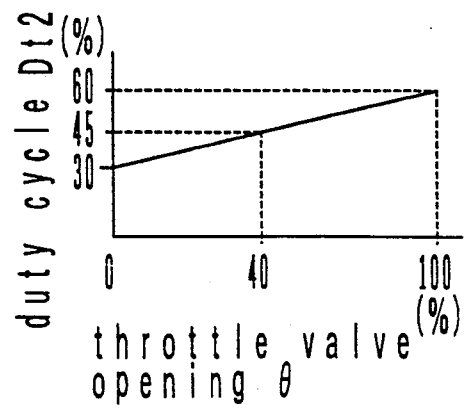
Figure 15A:
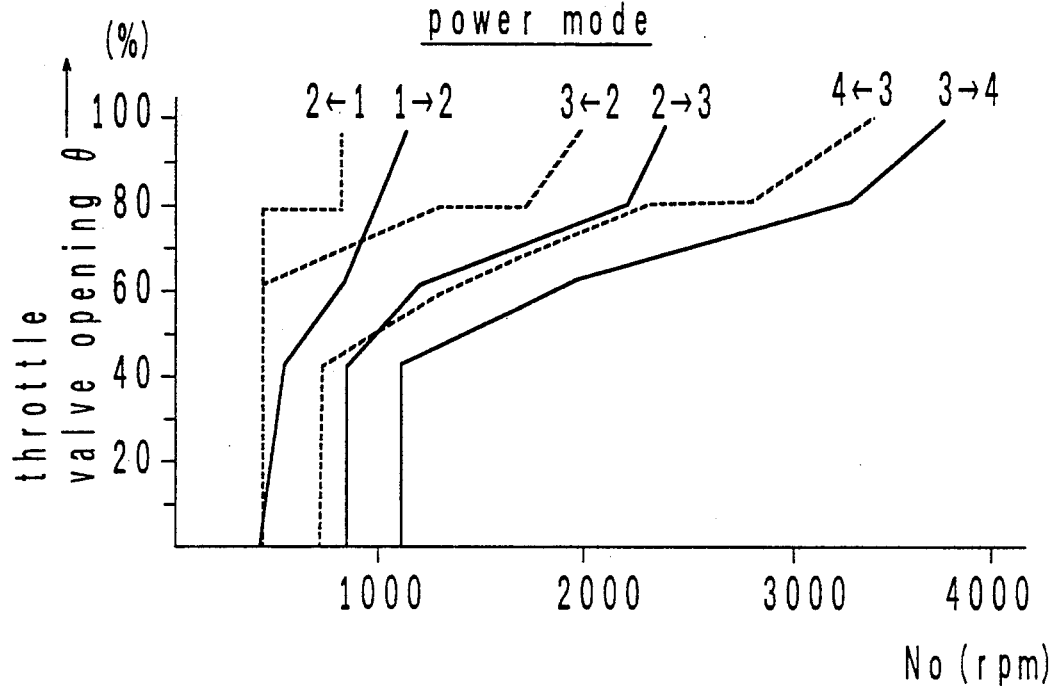
Figure 15B:
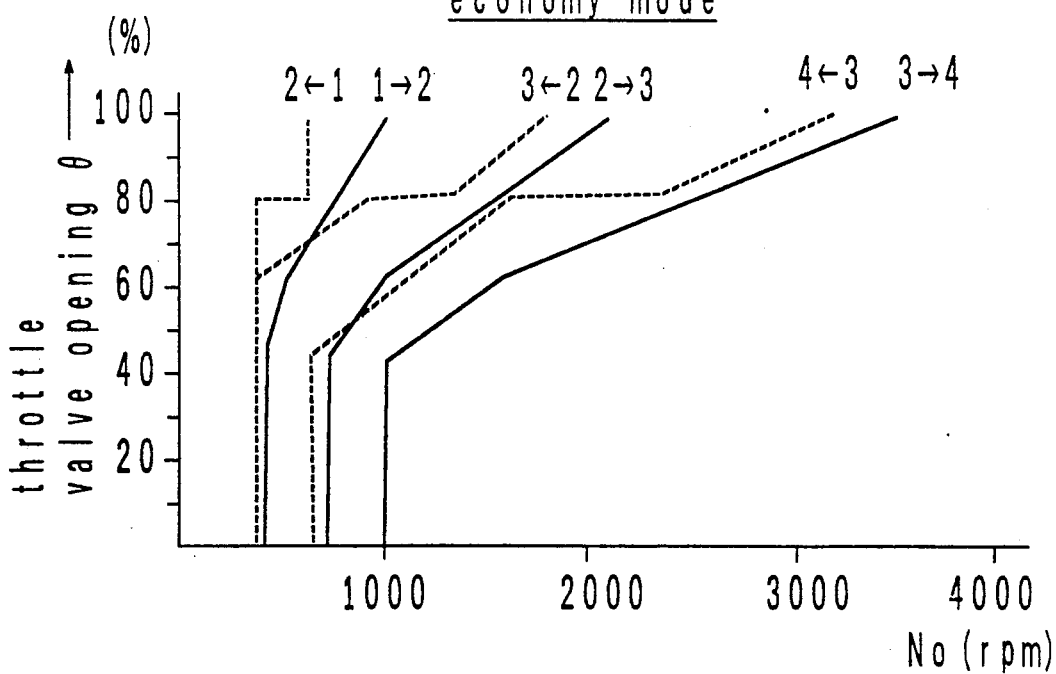

FIG. 11b is a graphical representation of regions divided in accordance with the opening $\theta$ of the throttle valve and the rotational speed $N_0$ of a wheel driving shaft, the duty cycle for the timing solenoid SL5 shown in FIG. 2b being determined in a manner corresponding to such region;

FIG. 11c is a timing chart showing the timing when the duty cycle of the timing solenoid valve SL5 shown in FIG. 2b is changed during a power on shift from a third or a fourth speed range to a second speed range;

FIG. 11d graphically shows an actual example of the region segmentation shown in FIG. 11b;

FIG. 11e graphically shows the relationship between the regions shown in FIG. 11d and a duty cycle which is determined in a corresponding manner;

FIG. 11f graphically shows a rising response in the oil pressure of a brake $B_1$ shown in FIG. 1 which results from the duty cycle determined in the manner illustrated in FIG. 11e during a 1→2 shift;

FIG. 11g graphically shows an oil pressure rising response of a brake $B_2$ during a 2→1 shift;

FIGS. 12a, 12b, 12c, 12d, 12e, 12f and 12g are a series of timing charts indicating the timings for turning on and off of the speed range establishing solenoid valve SL3 and the timing solenoid valve SL5 shown in FIGS. 2a and 2b during a shift operation from 1.5 speed range to another as well as during a reverse shift operation;

FIG. 13a is a table of data which is made reference to when determining a change-over point X between on/off condition of the speed range establishing solenoid valve SL3 shown in FIG. 12b;

FIG. 13b graphically shows a change in the pressures of the brakes $B_0$ to $B_2$ shown in FIG. 1 during a 1.5→2 shift operation shown in FIG. 12b;

FIG. 13c is a table of variance values to be added to the rotational speed of the drum of the clutch $C_1$ in a manner corresponding to the rotational speed $N_0$ of the output shaft in order to substantially eliminate any resulting shock during a 1.5→2 shift operation shown in FIG. 12b;

FIG. 14a is a timing chart indicating a change in the duty cycle of the solenoid valve SL4 as a time sequence when a directly coupled clutch 50 shown in FIG. 1 is energized (or locked up);

FIG. 14b graphically shows the duty cycle of the solenoid valve SL4 which is determined according to the opening $\theta$ of the throttle valve and which is to be assigned to Dt1 shown in FIG. 14a;

FIG. 14c is a timing chart indicating a regulation applied to the duty cycle of the solenoid valve SL4 in order to reduce resulting shocks during a shift operation in which the directly coupled clutch 50 shown in FIG. 1 is energized;

FIG. 14d graphically shows the duty cycle of the solenoid valve SL4 which is determined corresponding to the opening $\theta$ of the throttle valve and which is to be assigned to Dt2 shown in FIG. 14c;

FIG. 15a graphically shows a family of reference vehicle speeds used in determining the need to perform a shift operation when an economy mode is not specified during the "decision for any shift operation" (14) shown in FIG. 5a; and FIG. 15b graphically shows a family of reference vehicle speeds which are used in determining the need to perform a shift operation when an economy mode is specified during the "decision for any shift operation" (14) shown in FIG. 5a.

DESCRIPTION OF PREFERRED EMBODIMENTS

FIG. 1 shows a general mechanism according to one embodiment of the invention. An automatic transmission shown in FIG. 1 comprises a torque converter 1 with a directly coupled clutch 50, a subtransmission 2 formed by an overdrive mechanism, and a main transmission 3 formed by a change gearing and having three forward speed ranges and one reverse range, which are coupled together in the sequence named above.

The torque converter 1 comprises a pump 5, a turbine 6 and a stator 7 which are assembled together in a manner known in itself. The pump 5 is connected to a crankshaft 8 of an engine while the turbine 6 is connected to a turbine shaft 9, which represents an output shaft of the torque converter 1 and also forms an input shaft to the subtransmission 2 where it is connected to a carrier 10 of a planetary gearing thereof. A directly coupled clutch 50 is disposed between the crankshaft 8 of the engine and the turbine shaft 9. When operated, the clutch 50 mechanically couples the crankshaft 8 and the turbine shaft 9 together (lockup).

A planetary pinion 14 is rotatably supported by the carrier 10 and meshes with a sun gear 11 and a ring gear 15. Disposed between the sun gear 11 and the carrier 10 are an overdrive multi-disc clutch $C_0$ and an overdrive one-way clutch $F_0$, and an overdrive multi-disc brake $B_0$ is disposed between the sun gear 11 and a housing or an overdrive casing which houses the overdrive mechanism.

The ring gear 15 of the subtransmission 2 is connected to an input shaft 23 of the main transmission 3. A front multi-disc clutch $C_1$ is disposed between the input shaft 23 and an intermediate shaft 29, and a reverse multi-disc clutch $C_2$ is disposed between the input shaft 23 and a sun gear shaft 30. A multi-disc brake $B_1$ is disposed between the sun gear shaft 30 and the casing of the transmission, and a sun gear 32 mounted on the sun gear shaft 30 forms two trains of planetary gearing together with a carrier 33, a planetary pinion 34 which is carried by the carrier, a ring gear 35 which meshes with the pinion, another carrier 36, a planetary pinion 37 which is carried by the carrier 36, and a ring gear 38 which meshes with the pinion 37. A one-way clutch $F_1$ and a brake $B_2$ are interposed between the carrier 36 and the casing of the transmission. The ring gear 35 which is disposed in one of the two trains of the planetary gearing is connected to the intermediate shaft 29. The carrier 33 of this planetary gearing is connected to the ring gear 38 of the other planetary gearing, and the carrier and the ring gear are connected to the output shaft 39. In response to an output from an engine and in accordance with the vehicle speed, an automatic transmission with an overdrive unit as mentioned above is controlled by a hydraulic control system to be described later to engage or release various clutches and brakes in order to perform a shift operation to four forward ranges (a first, a second, a third, a fourth speed range: O/D) including the overdrive (O/D), one forward range by a manual shift operation (1.5 speed range=LS) and one reverse range.

A hydraulic circuit which selectively activates the clutches $C_0$, $C_1$, $C_2$ and brakes $B_0$, $B_1$, $B_2$ and the directly coupled clutch 50 of the torque converter in the automatic transmission to perform an automatic shift operation is shown in FIGS. 2a and 2b.

The hydraulic circuits shown in FIGS. 2a and 2b include an oil sump 100, an oil pump 101, a pressure regulating valve 102, an auxiliary pressure regulating valve 103, a linear solenoid SL6, a manual valve 200, 1-2 shift valve 220, 2-3 shift valve 230, 3-4 shift valve 240, a ½ shift controlling solenoid valve SL1, a ⅔ shift controlling solenoid valve SL2, a 3/4 shift controlling solenoid valve SL3, accumulators 260, 270, 280, 290, an accumulator pressure control valve 110, a modulator valve 90, an orifice control valve 80, a timing solenoid valve SL5, a low coast modulator valve 250, a discharge pressure valve 70, a lockup control valve 360, a lockup control signal valve 370, a lockup controlling solenoid valve SL4 and other hydraulic elements and oil paths which provide connections between these valves and which provide a servo circuit connection for the oil pressures of the clutches and brakes.

A working oil which is pumped from the sump 100 by the pump 101 is regulated to a given oil pressure (line pressure) by means of the pressure regulating valve 102, and is then fed to oil paths 104 and 105. The oil pressure which is supplied through the oil path 105 to the auxiliary pressure regulator valve 103 is then regulated by the linear solenoid valve SL6 to provide a torque converter pressure, a lubricant pressure and a cooler pressure which are determined in accordance with a throttle opening and a vehicle speed. The manual valve 200 which is connected to the oil path 104 is mechanically coupled to a shift lever which is mounted adjacent to a driver's seat, and may be displaced to P, R, N, D, S and L positions corresponding to the range of the shift lever through a manual operation.

In the hydraulic circuit shown in FIG. 2, a combination of the energization or deenergization of the shift controlling solenoid valves SL1 to SL3 determines a particular speed range of the automatic transmission shown in FIG. 1 (figures appearing in the columns of D, S, L) as indicated in the table of FIG. 3 where o represents the energization and x represents the deenergization of the respective solenoids. It is to be noted that O/D appearing in the column of speed range in FIG. 3 represents the fourth speed range (overdrive) while LS represents a speed range intermediate the first speed range (having a gear ratio of 2.905) and a second speed range (having a gear ratio of 1.530), and which can be denoted as a 1.5 speed range having a gear ratio of 2.257.

Directing our attention to features of the described automatic transmission which are shown in FIGS. 1, 2a and 2b, it is to be noted that LS (1.5 speed range) is located between the first and the second speed range. The purpose of LS (1.5 speed range) is to realize a smooth running response which assures a relatively high speed with a sufficient power when running on a up-grade road and to realize a smooth running response which assures an appropriate engine braking operation while running down a down-grade road even though the vehicle with a heavy load is running an up-grade road, where the choice of the first speed range will result in a retarded speed and the choice of a second speed range will result an insufficient power to cause an unstable running condition (there will be a relatively frequent shift between the first and the second speed range, and such shift operation is likely to cause shocks) and even though the choice of the first speed range will result in an excessive engine braking operation and the choice of the second speed range will be a poor engine braking operation when the vehicle is running down a down-grade road (there will be a relatively frequent shift between the first and the second speed range, and such shift operation is also likely to cause shocks).

If an arrangement is made to establish the 1.5 speed range (LS) automatically between the first and the second speed range of D range, the speed zones contained in the first and the second speed range of D range will be divided into three segments rather than two segments, resulting in a reduced width of the resulting speed zones, causing an increase in the frequency of the shift operation and causing an unusual sensation of a driver, which is caused by resulting shocks and a changeover between speed ranges.

For this reason, in the present embodiment, the 1.5 speed range (LS) is established in response to a command for the 1.5 speed range (LS) issued by a switch operation by a driver when the shift lever assumes a position within L range.

In the automatic transmission shown in FIG. 1, if the subtransmission 2 assumes an overdrive condition (O/D; $C_0$ turned off, $B_0$ released) and the main transmission 3 assumes a first speed range ($C_1$ turned on, $C_2$ turned off, $B_1$ released and $B_2$ engaged), the resulting gear ratio will assume a value (2.257) which is intermediate the gear ratio (2.950 and 1.530) of the first and the second speed range, and accordingly this value is defined to be 1.5 speed range (LS). When commanding the 1.5 speed range, the subtransmission 2 is established in its O/D condition while the main transmission 3 is chosen to be in its first speed range (FIG. 3).

Another feature of the automatic transmission shown in FIGS. 1, 2a and 2b relates to the provision of accumulators 260, 270, 280 and 290 which serve preventing the occurrence of shocks as a result of the shift operation. Each accumulator internally contains a piston which is urged upward by a coiled compression spring, not shown. The back pressure on this piston is controlled by the linear solenoid valve SL6 through the accumulator pressure control valve 110, while the timing solenoid valve SL5 is effective to provide a smooth changeover of pressures as the associated clutches and brakes are activated or terminated, by supplying an oil pressure to the brake $B_1$ through both orifices 81 and 82 (a retarded rising) or by bypassing through the orifice 82 (a rapid rising).

In this embodiment, an output pressure from the linear solenoid valve SL6 (a pressure which is proportional thereto is supplied by the actuator pressure control valve 110 to each of the accumulators 260 to 290) is substantially inversely proportional to the duty cycle of the current flow which energizes the valve SL6. Specifically, as the duty cycle of the current flow which energizes the linear solenoid valve SL6 increases, the back pressure on the piston of each of the accumulators 260 to 290 reduces, thus reducing the oil pressure which causes the engagement of the clutch or brake associated therewith. In a particular shift mode which is likely to cause shocks as a result of a shift operation, such shocks are prevented by establishing a high value of duty cycle for the linear solenoid valve SL6.

When the timing solenoid valve SL5 is turned on to establish the duty cycle of 100%, it connects a pilot pressure chamber of the orifice control valve 80 to a drain, whereby the orifice control valve 80 bypasses an oil path connecting between the orifices 81, 82 to the brake $B_1$ (accumulator 280). As a result, the pressure will be reduced at a rapid rate when releasing the brake $B_1$, whereby the brake will be released rapidly (or conversely, when engaging the brake, the engagement will occur rapidly). However, when the timing solenoid valve SL5 is turned off to establish the duty cycle of 0%, the oil pressure in the pilot pressure chamber of the orifice control valve 80 rises, whereby the orifice control valve 80 disconnects the oil path connecting between the orifices 81 and 82 from the brake $B_1$ (accumulator 280). Accordingly, the brake $B_1$ will be connected to the oil pressure line through the orifices 81 and 82, so that the pressure will be reduced at a retarded rate when releasing the brake $B_1$ (the brake will be released slowly) while the pressure rises at a slow rate when engaging the brake $B_1$ (the brake will be engaged slowly).

Figure 4:
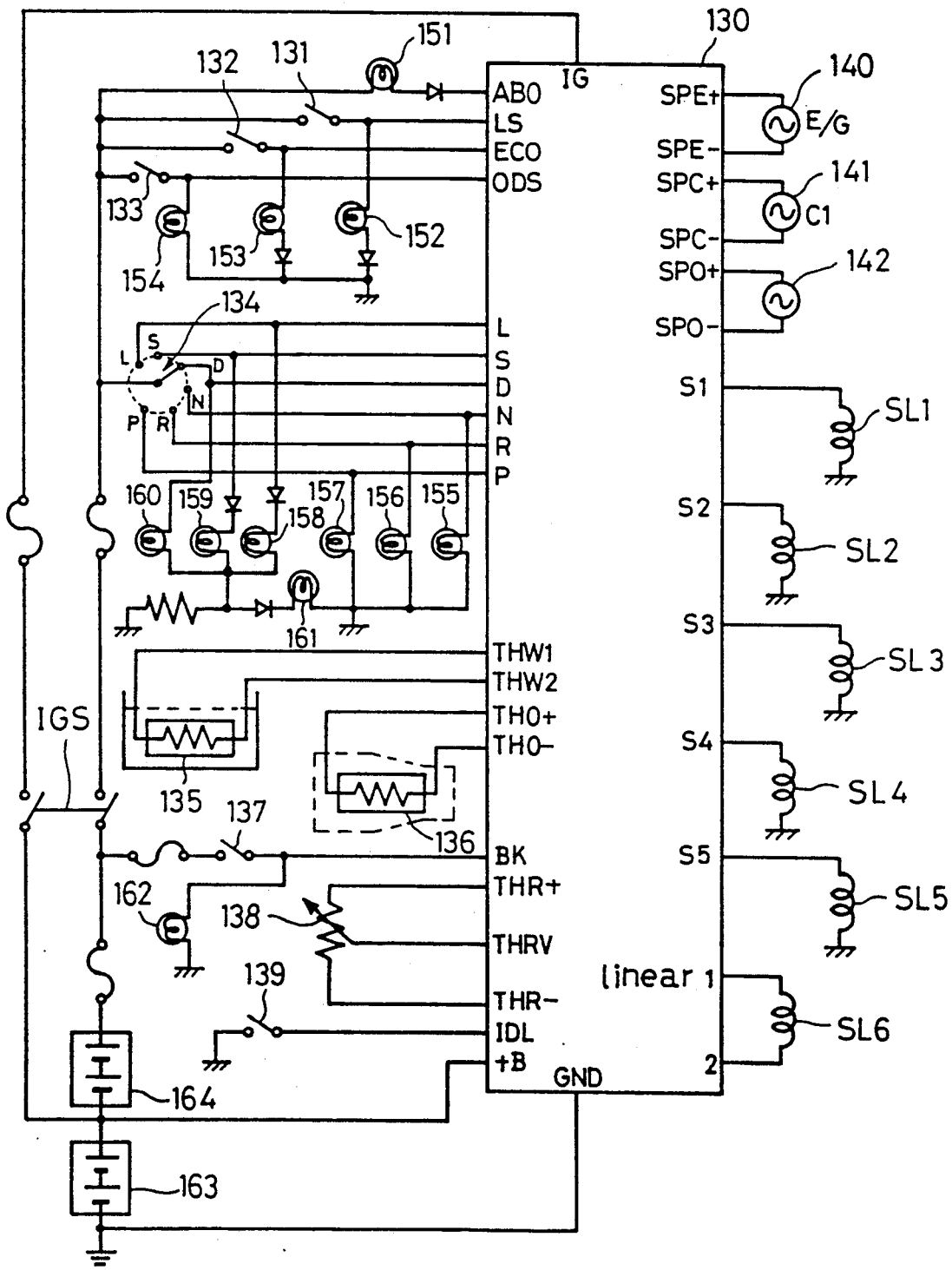
FIG. 4 is a block diagram of an electrical circuit for energizing solenoid valves (SL1 to SL3) shown in FIGS. 2a and 2b, a solenoid valve (SL4) for controlling a lockup, a timing solenoid valve (SL5) and a linear solenoid valve (SL6)

FIG. 4 schematically shows an electrical control system which controls the energization of the shift solenoid valves SL1 to SL3, the lock-up control solenoid valve SL4, the timing controlling solenoid valve SL5 and the linear solenoid valve SL6 of the hydraulic circuit shown in FIGS. 2a and 2b.

The heart of the electrical control system comprises a control board 130, which comprises a microcomputer (hereafter referred to as CPU) and an input/output interface assembled together on a printed circuit board. Connected to the input interface of the control board 130 are a pulse generator 140 which generates electric pulses at a frequency which is proportional to a rotational speed Ne of the input shaft 8 of the torque converter 1 (or the output shaft of the engine), a pulse generator 141 which generates electric pulses at a frequency which is proportional to a rotational speed Nt of the output shaft 23 ($C_1$ drum) of the subtransmission 2, a pulse generator 142 which generates electric pulses at a frequency which is proportional to a rotational speed No of the output shaft (a wheel driving shaft) 39 of the main transmission 3, a first speed range (LS) command switch 131, a fuel saved running command switch 132, a fourth speed range (O/D) inhibit command switch 133, a shift lever position detecting switch 134, a sensor 135 for detecting the temperature of an engine cooling water, a sensor 136 for detecting the temperature of an oil in the oil sump 100 in the hydraulic circuit shown in FIGS. 2a and 2b, a brake switch 137, a throttle opening sensor 138, an idling opening sensor 139, an ignition key switch IGS and onboard batteries 163, 164.

Various input switches mentioned above are connected to associated indicator lamps. Specifically, when the first speed range command switch 131 is closed, commanding the selection of the first speed range, a lamp 152 will be illuminated. When the fuel saved running command switch 132 is closed, providing a command to run the vehicle in a fuel saving mode, a lamp 153 will be illuminated. When the fourth speed range (O/D) inhibit switch 133 is closed, commanding a corresponding inhibit, a lamp 154 will be illuminated.

When the shift lever is in its N (neutral) position N, the switch 134 will be in its D position and a lamp 155 will be illuminated. In R (reverse) position of the shift lever, a lamp 156 will be illuminated. In P (parking) position of the shift lever, a lamp 157 will be illuminated. In the L position of the shift lever, the switch 134 assumes its L position and lamps 158 and 161 will be illuminated. In the S position of the shift lever, lamps 159, 161 will be illuminated. In the D position, lamps 160 and 161 will be illuminated. The illumination of the lamp 161 indicates that the shift lever assumes a forward position. When the brake switch 137 is closed, indicating that a brake pedal has been depressed, a lamp 162 will be illuminated.

Electric pulses developed by the pulse generators 140, 141 and 142 are shaped into rectangular waves of a given level by the input interface before they are applied to an external interrupt input port of CPU in the control board 130. A binary signal (assuming a high level H equal no command when the associated switch is open and indicating a low level L equal a command condition when closed) such as from the first speed range command switch 131, the shift lever position detecting switch 134 or the like is fed to the input interface where a chattering occurring between a change between its levels are removed to provide a single rising or falling pulse as it is applied to the input port of CPU in the control board 130. Analog signals from the water temperature sensor 135, the oil temperature sensor 236 and the throttle valve opening sensor 138 are subject to a smoothing and level converting amplification in the input interface before they are applied to an analog signal input port (A/D conversion input port) of CPU in the control board 130.

In response to the falling edge of a pulse developed by any of the pulse generators 140, 141 and 142, CPU in the control board 130 executes an interrupt operation to detect the rotational speed Ne of the engine, the rotational speed Nt of the output shaft of the subtransmission and the rotational speed No of the wheel driving shaft, reads the open or closed condition of the various input switches and detecting switches (representing the presence or absence of various commands), reads the water temperature signal, the oil temperature signal and the throttle valve opening signal after their analog-to-digital conversion, establishes a speed range as indicated in FIG. 3, performs a shift operation to the particular speed range, detects any abnormality occurring in the transmission, detects any abnormality in the water or oil temperature, and illuminates the abnormality indicator lamp 151 in a flashing pattern which corresponds to the particular abnormality whenever such abnormality has been detected.

When establishing a speed range or shifting to a different speed range (see FIG. 3) and when activating and deactivating the lockup, CPU in the control valve 130 performs such operation by changing and regulating the pressures supplied to various clutches and brakes through an output interface thereof, namely turning the solenoid valves SL1 to SL3 either on or off, turning the solenoid valves SL4 and SL5 either on or off or controlling their duty cycle, and controlling the duty cycle of the current flow through the linear solenoid valve SL6 in accordance with the opening $\theta$ of the throttle valve and the vehicle speed No.

The control board 130 includes a memory backup power circuit which maintains a memory activating voltage applied to CPU even if the ignition key switch IGS is open, thus retaining data which is written into the internal memory of CPU. The input switches, lamps and various sensors are connected to a signal processing circuit which is fed from a single power circuit which is in turn fed from batteries 163, 164 through the ignition key switch IGS. On the other hand, solenoid valves, SL1 to SL6, are connected to the output terminals of solenoid drivers which are fed from a high power circuit which is in turn fed from the same batteries 163, 164 through the ignition key switch IGS. A given voltage is applied to a control signal input circuit of each of the solenoid drivers from the signal power circuit. Accordingly, during the time the ignition key switch IGS remains open, the power consumption from the battery by the memory backup power circuit and the CPU is minimal.

FIG. 5a to 5e are flow charts of a main routine of CPU contained in the control board 130 in exercising its control operation. When a power supply to the control board 130 is turned on at step 1 shown in FIG. 5a (hereafter a particular step or subroutine will be designated by an associated numerical figure alone without using the term "step" or "subroutine"), thus connecting the battery 163 to the control board 130. Internal registers, timers and counters within CPU will be reset to their initial standby conditions while standby signal levels are delivered to output ports (2). In this manner, SL1 to SL6 are all turned off or deenergized.

The battery 164 is connected in the manner illustrated in FIG. 4, and subsequently when the ignition key switch IGS is closed and as long as it remains closed, CPU performs and repeats a control operation of one cycle, represented by steps 3 to 69 shown in FIGS. 5a to 5e, with a TP period.

At the outset of the control operation of one cycle, a timer TP is started (3). Subsequently, input switches, throttle valve opening sensor and the like are read (4). During a data processing 1 (5), inputs which are read in this manner are written into registers to which reference will be made during the execution of a control program, and various parts are examined if there is any indication of abnormality on the basis of such input data. Whenever an abnormality is detected, the lamp 151 is illuminated.

During data processing 2 (6), CPU in the control board 130 then determines, on the basis of the shift lever position, a current speed range which is currently established by the automatic transmission shown in FIG. 1 and depending if the fuel saved running command switch 132 is turned on or off, a possible shift mode or a next speed range to which a shift up/down from the current speed (which is indicated by the content of the current speed range register PS) can be made. In the present embodiment, a reference vehicle speed (actually, a group of reference vehicle speed values) having a throttle valve opening as a parameter and which is used in determining the need to make a shift from a particular speed range (for example, a third speed) to another speed range (a first, a second or a fourth speed range) is provided in two sets, namely, one used when the fuel saved running is specified (economy mode data group: FIG. 15b) and another used when such running is not specified (power mode data group: FIG. 15a). Accordingly, during the data processing 2 (6), data indicating a possible shift mode from the current speed range is determined as well as data indicating if the economy mode is or is not employed are used to specify a particular reference vehicle speed group.

On the basis of the input data which is read at the input reading (4) and written into the registers at the data processing 1 (5), CPU in the control board 130 then examines (7, 11) if a 1.5 speed range (LS) is to be established in consideration of the correlation between the shift lever position (output from the switch 134) and the presence or absence of a command for the 1.5 speed range (LS) (open or closed condition of the switch 131). In the present embodiment, the 1.5 speed range is established only in the L position of the shift lever and when the switch 131 is closed. In this instance, 1 (representing the need to establish the 1.5 speed range) is written into register LSF (12). Otherwise, the register LSF is cleared (13).

During a shift decision (14), a reference is made to the current speed range (the content of current speed range register PS), the content of register LSF and the input data from the fourth speed inhibit switch 133, data representing the 1.5 speed range is written into a target speed range register DS if the content of the register LSF is equal to 1, indicating the need to establish the 1.5 speed range. If the content of register LSF is equal to 0, indicating no command, a reference is made to data which specifies a particular reference vehicle speed group. Such data comprises data indicating a possible shift mode from the current speed range and data indicating if the economy mode is employed or not. Initially, a particular reference vehicle speed group (one of solid line curves shown in FIGS. 15a and 15b) is specified from a highest one (SRi speed range) of speed ranges, to which an up shift from the current speed range (the content of register PS) can be made, and from which the first speed range is excluded when the inhibit switch 133 is closed. From this group, the value of a particular speed corresponding to the current throttle valve opening, representing a single point on the specified solid line curve, is selected, and is compared against a current vehicle speed No. If the vehicle speed No is equal to or greater than the reference vehicle speed value, indicating the need for an up shift, data indicating SRi speed range is written into the target speed range register DS. Otherwise, such entry is not made, but a similar decision is repeated for a next lower speed range. If the need for an up shift is not found to any of speed ranges higher than the current speed range, a particular reference vehicle speed group (one of broken line curves shown in FIGS. 15a and 15b) is specified from a lowest one (SRj) of speed ranges, to which a down shift can be made from the current speed range. From this group, a value of a particular reference speed representing a single point on the specified broken line curve which corresponds to the current throttle valve opening is selected, and is compared against the current vehicle speed No, and if the vehicle speed No is equal to or less than the reference vehicle speed, indicating the need for a down shift, data indicating SRj speed range is written into the target speed range register DS. If the reference vehicle speed is exceeded, such entry is not made, but a similar decision is repeated for a next higher speed range. It is to be noted that when the switch 133 is closed, representing an inhibit of the fourth speed range, and if the content of the current speed range register PS indicates the fourth speed range, the third speed range is written into the target speed range register DS in order to perform a down shift from the fourth to the third speed range.

CPU in the control board 130 then compares the current speed range (the content of register PS) and the content of the target speed range register DS (a speed range to be established) against each other, and in the event they do not compare, indicating the need for a shift operation, writes the particular speed range stored in the target speed range register DS into a next speed range register SS and a next following speed range register SSN (15-16-17-18) unless a shift operation is not currently being performed. However, if it is in the process of a shift operation now, the speed range in the register DS is written into only the next following speed range register SSN (15-16-17-36).

If it is not in the process of a shift operation now, a timer TB is started (19), and 1, indicating the timer TB in operation, is written into a register TBF (20). When the timer TB times out, the solenoid valves SL1 to SL3 and the timing solenoid valve SL5 are energized in order to establish a particular speed range which is written into the next speed range register SS. A timing controlling timer is started in order to achieve a smooth transition of oil pressures to the clutches and brakes during a shift operation, and data is entered into various registers (44 to 54).

The detection of shift time (TSO, TSE) (64), the control of the linear solenoid valve SL6 (65), the control of the timing solenoid valve SL5 (66), the lockup control (67) and the output control (68) are sequentially executed in the sequence named. When the timer TP times out (69), the timer TP is started again (3), initiating the control operation of the next one cycle. By repeating the control operation of one cycle with the TP period, the decision for a shift operation and the control over the up/shift down when the need for a shift operation is found can be smoothly achieved in a time sequence.

Figure 5B:
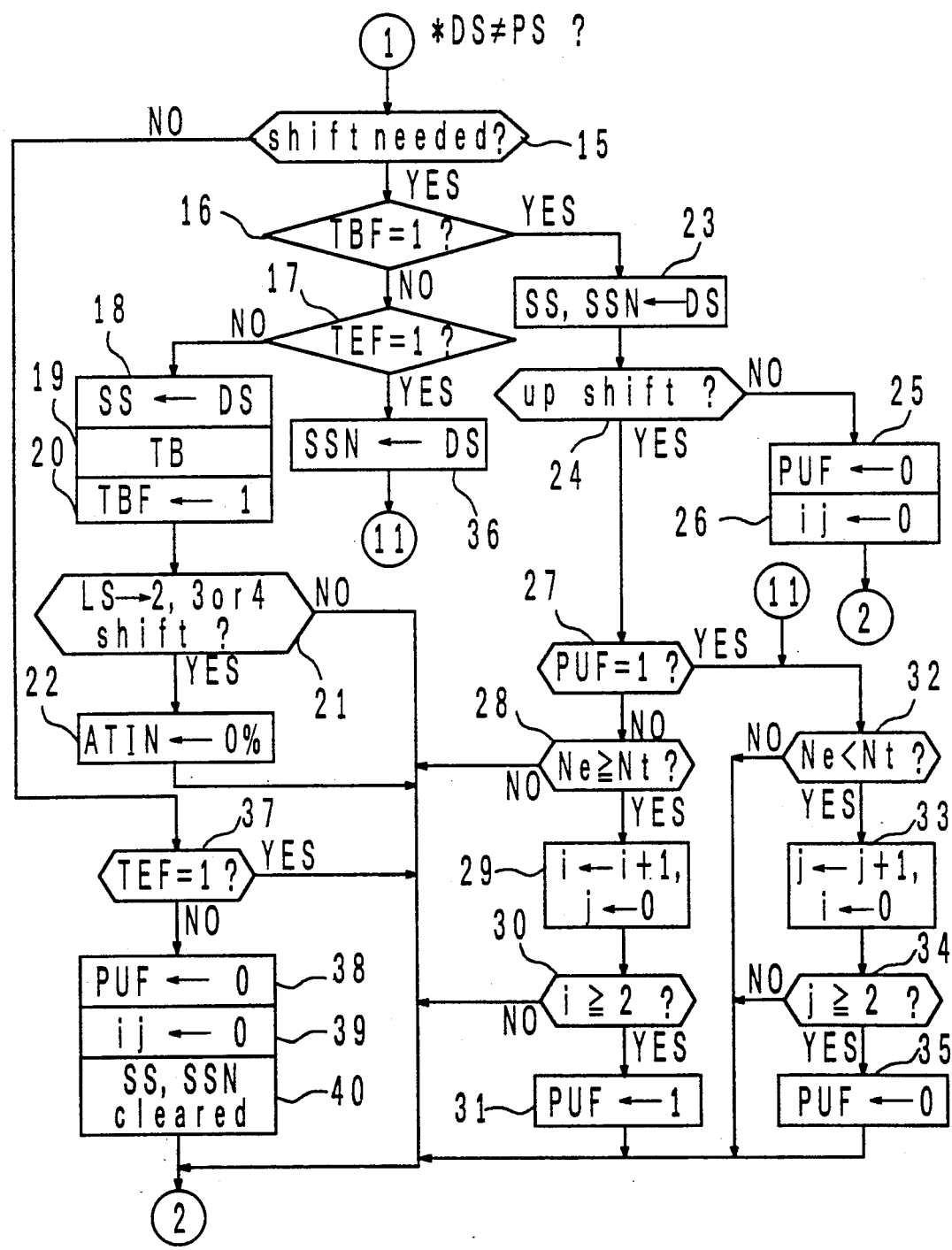
Figure 5C:
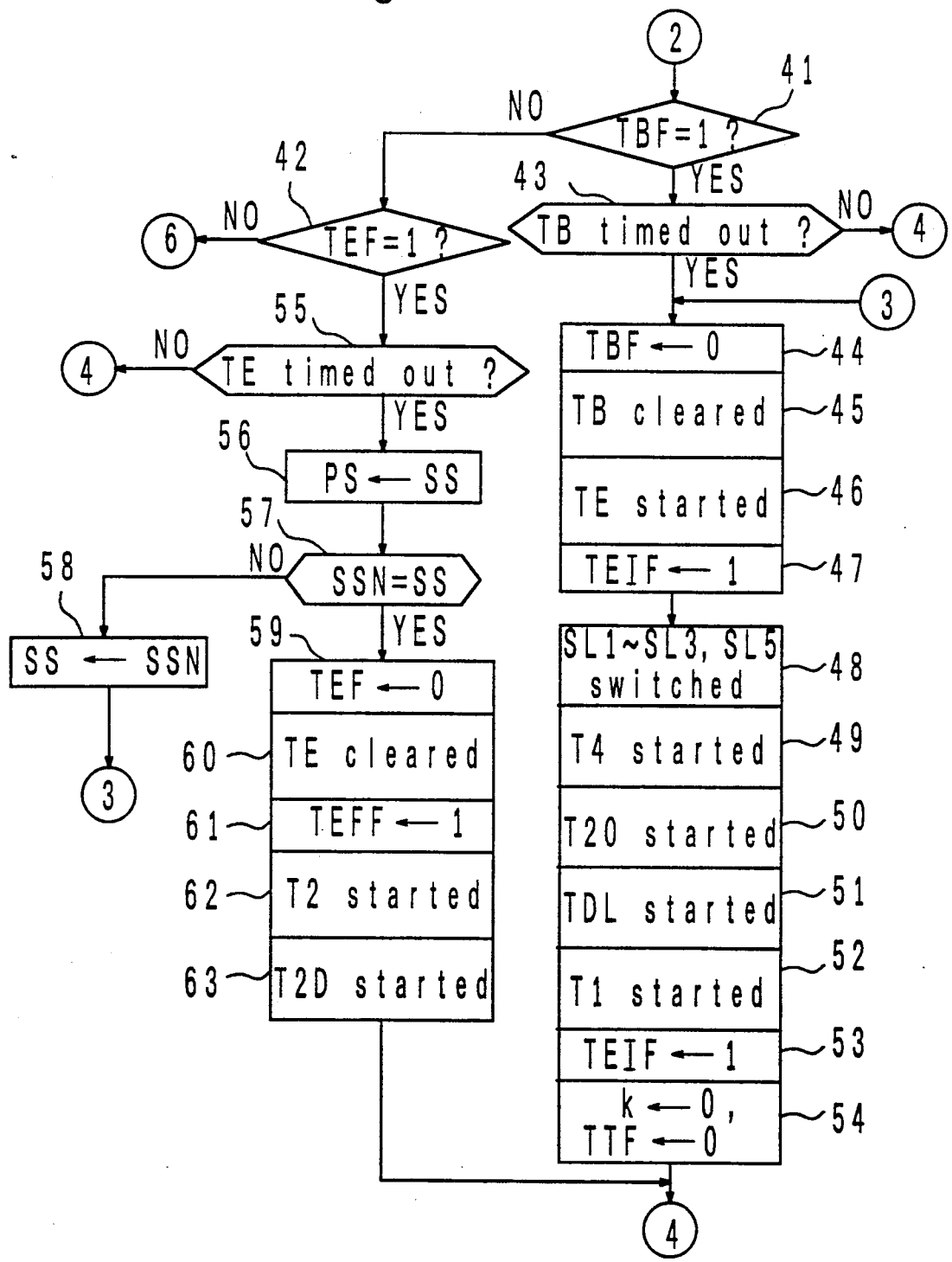
Figure 5D:
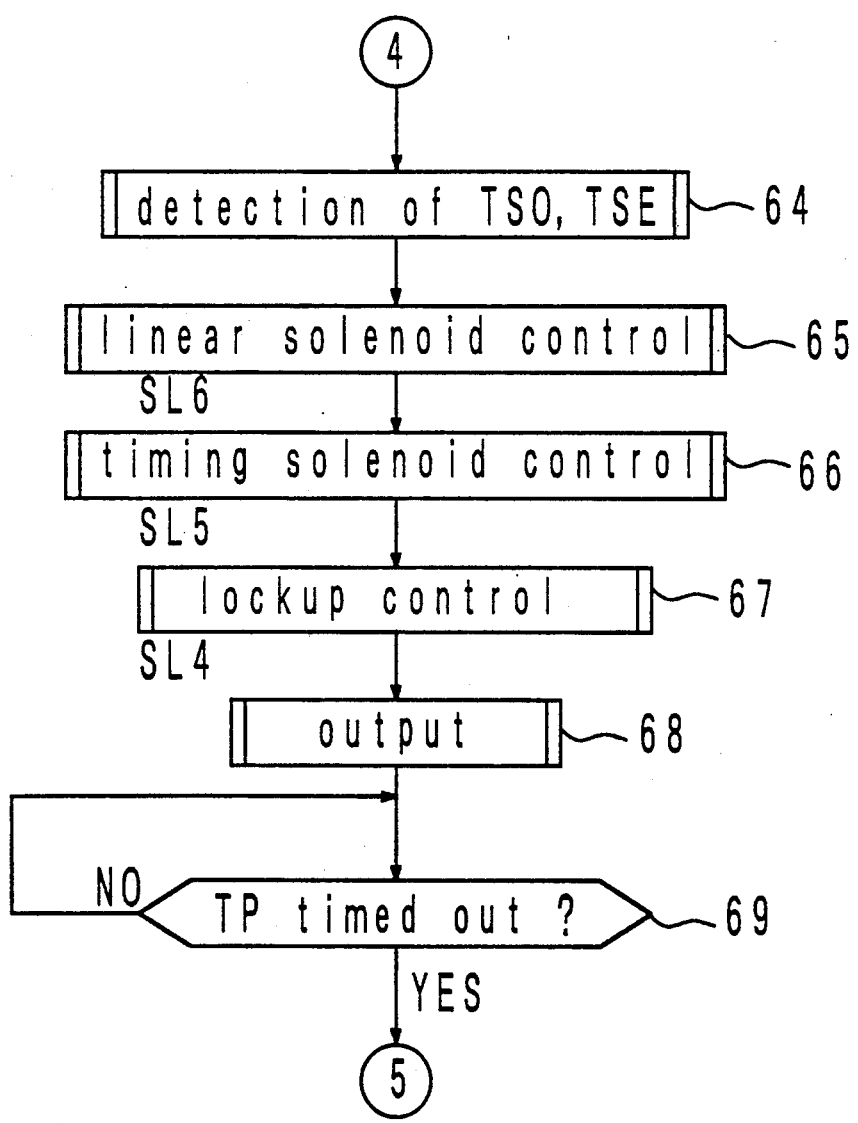
Figure 5E:
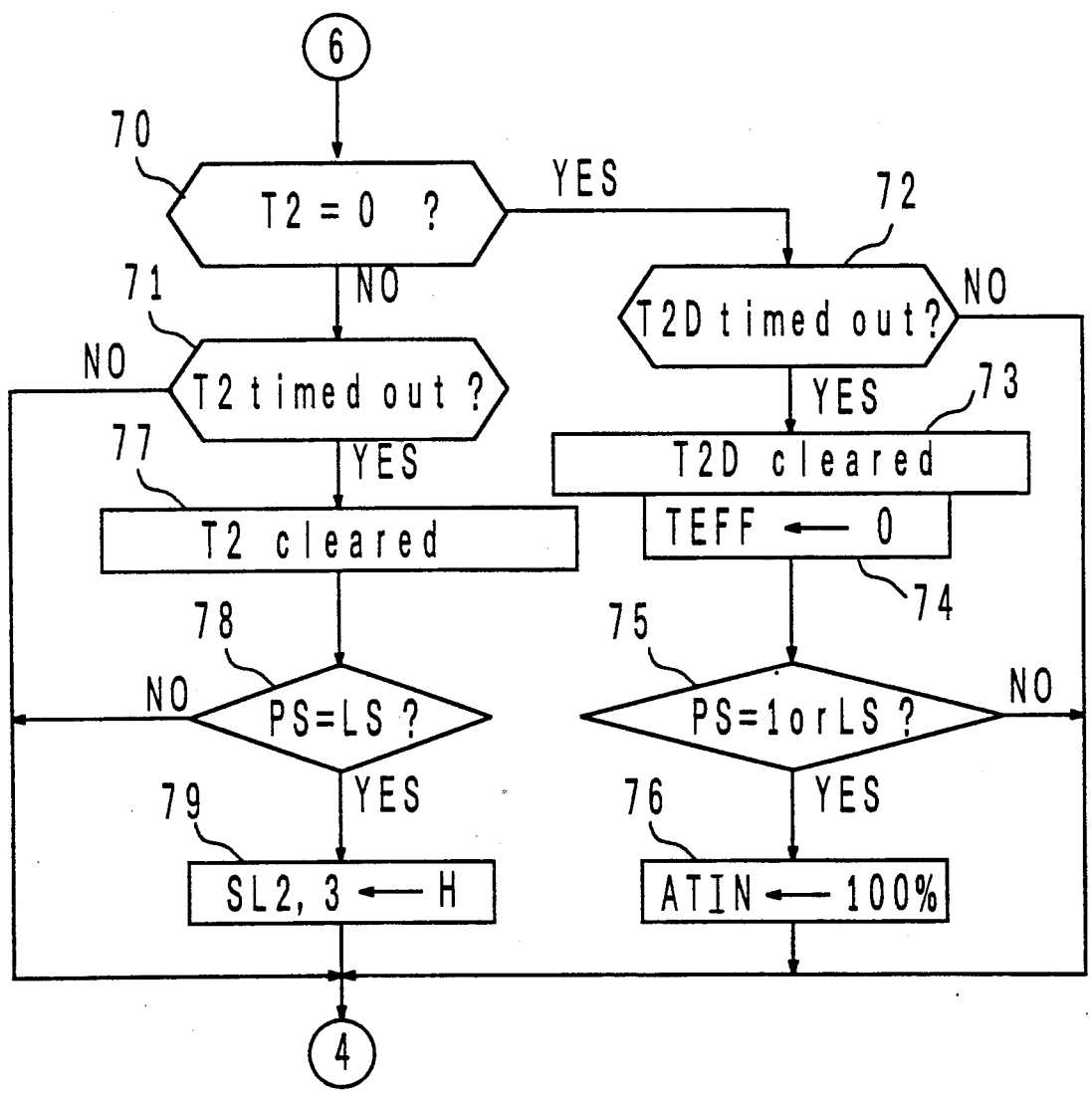
Figure 6A:
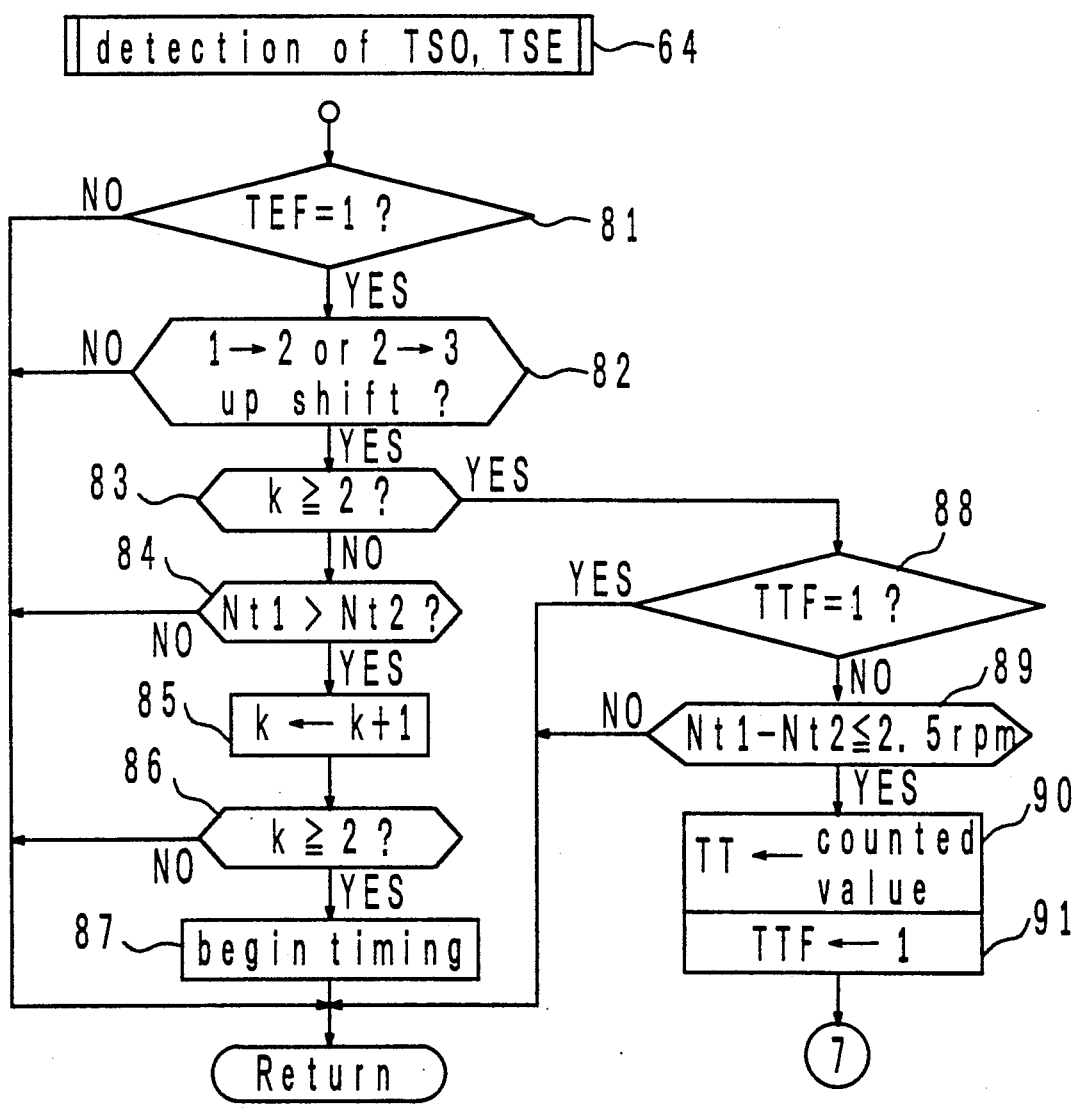
FIGS. 6a and 6b are flow charts indicating the detail of "detection of TSO, TSE" (64) shown in FIG. 5d.
Figure 6B:
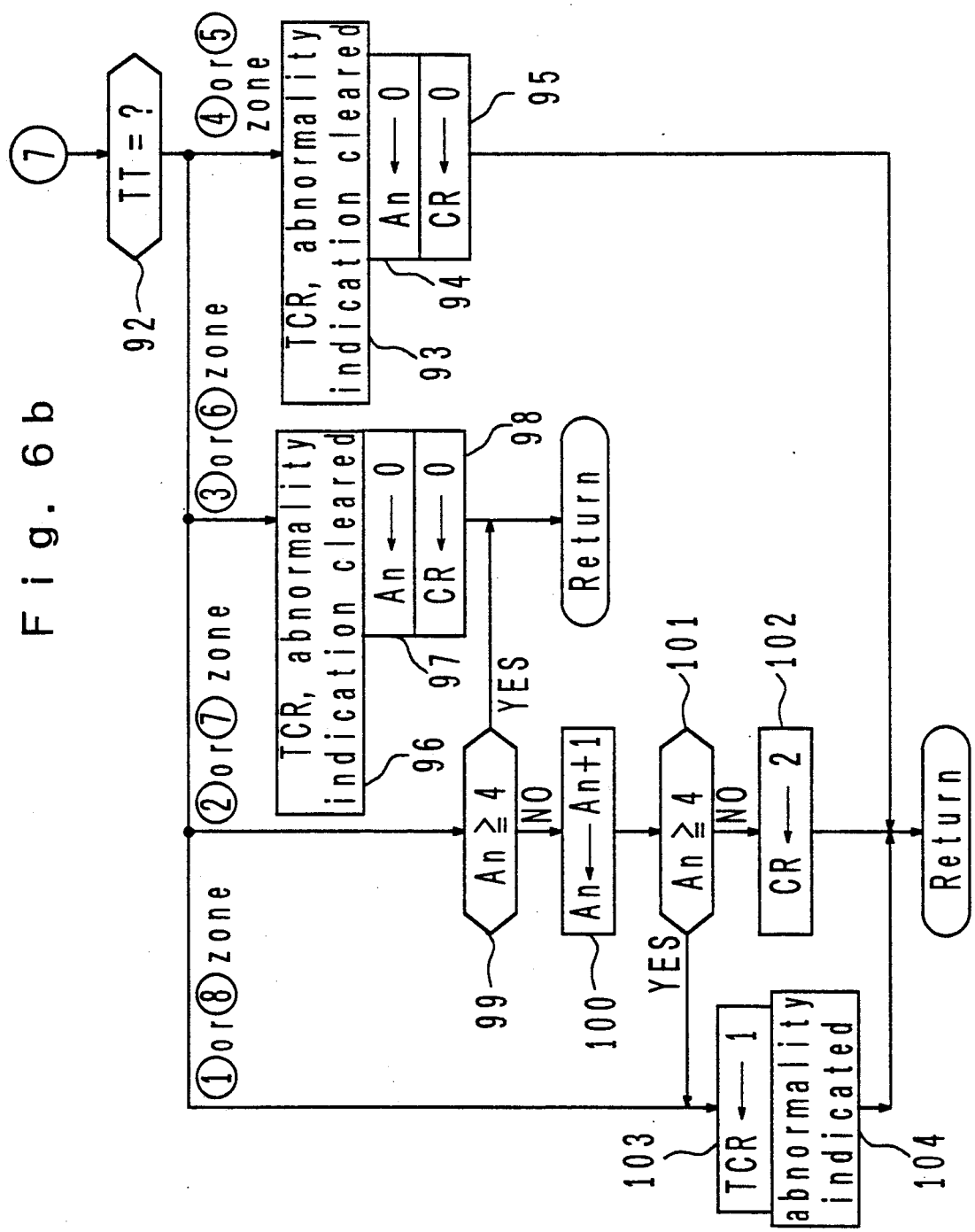
Figure 7A:
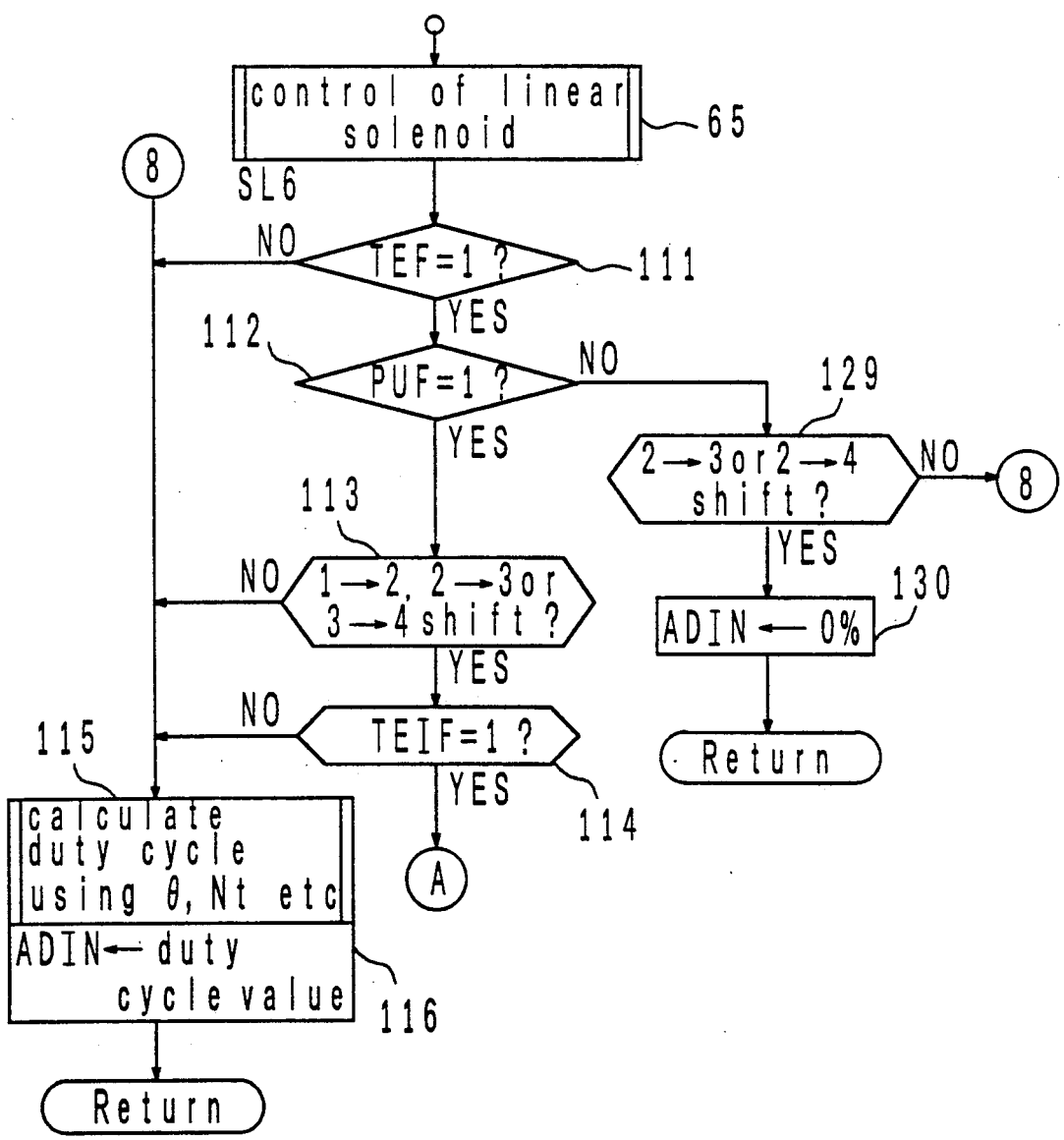
FIGS. 7a and 7b are flow charts indicating the detail of "control of linear solenoid" (65) shown in FIG. 5d.
Figure 7B:
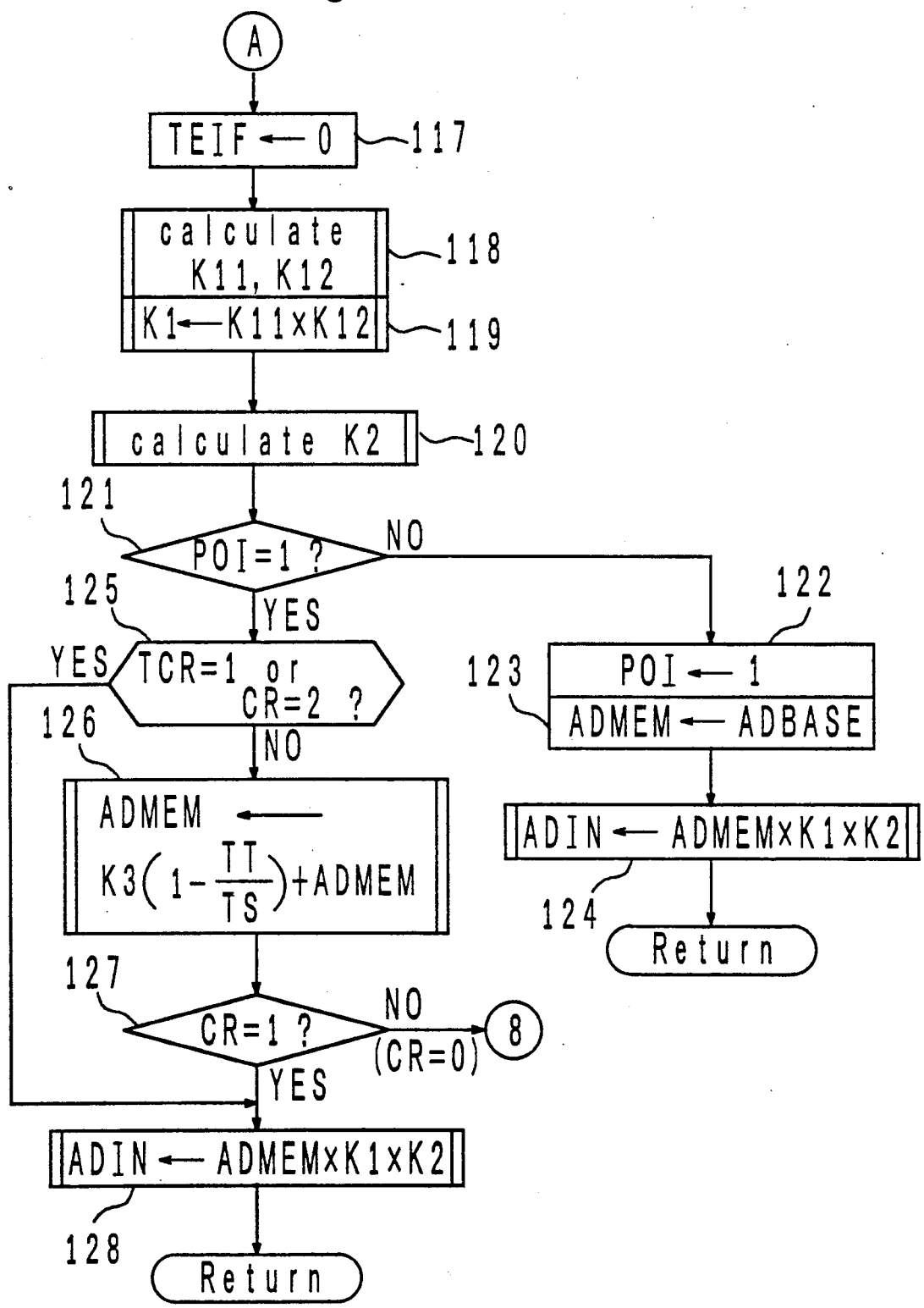
Figure 8A:
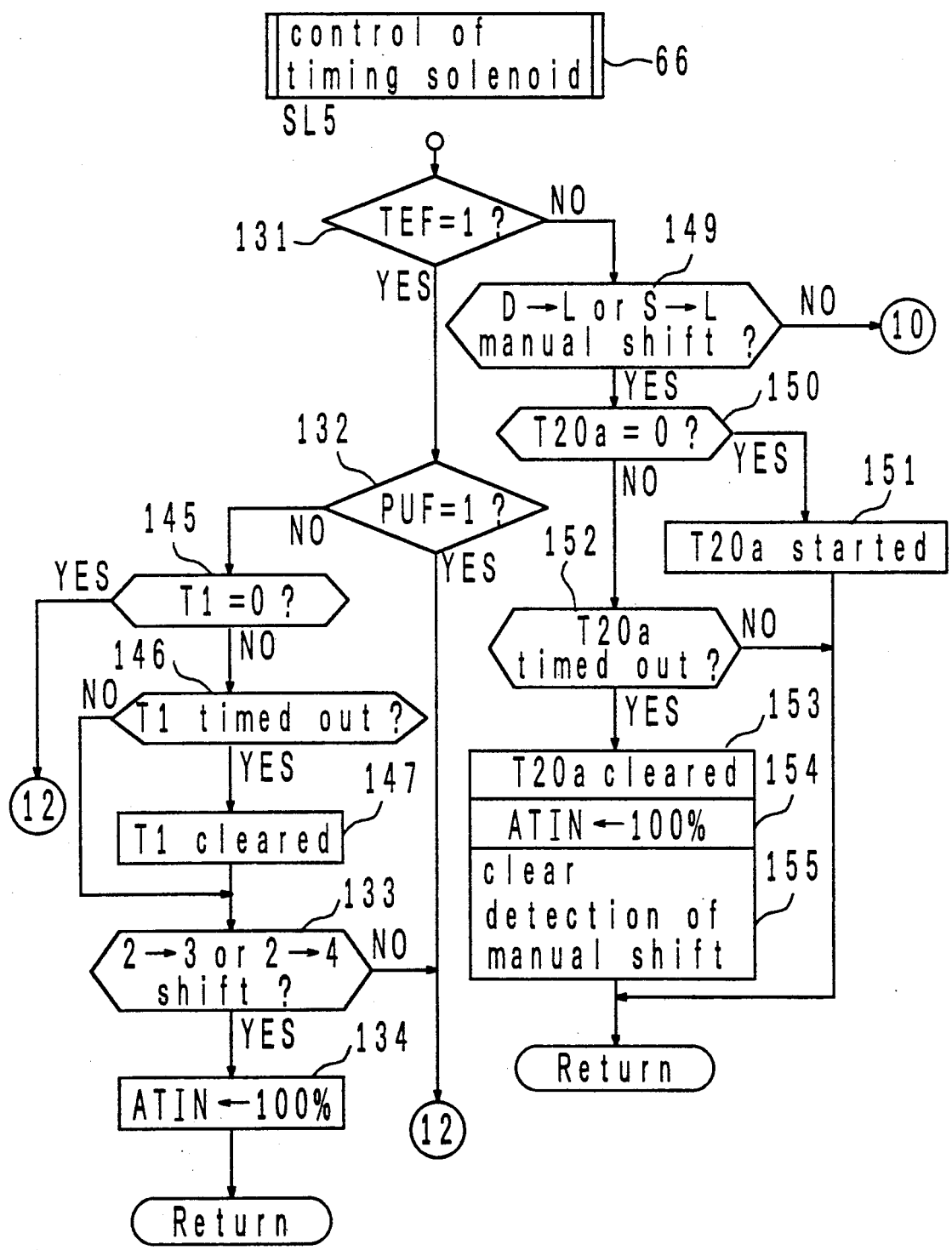
FIGS. 8a, 8b and 8c are flow charts indicating the detail of "control of timing solenoid" (66) shown in FIG. 5d.
Figure 8B:
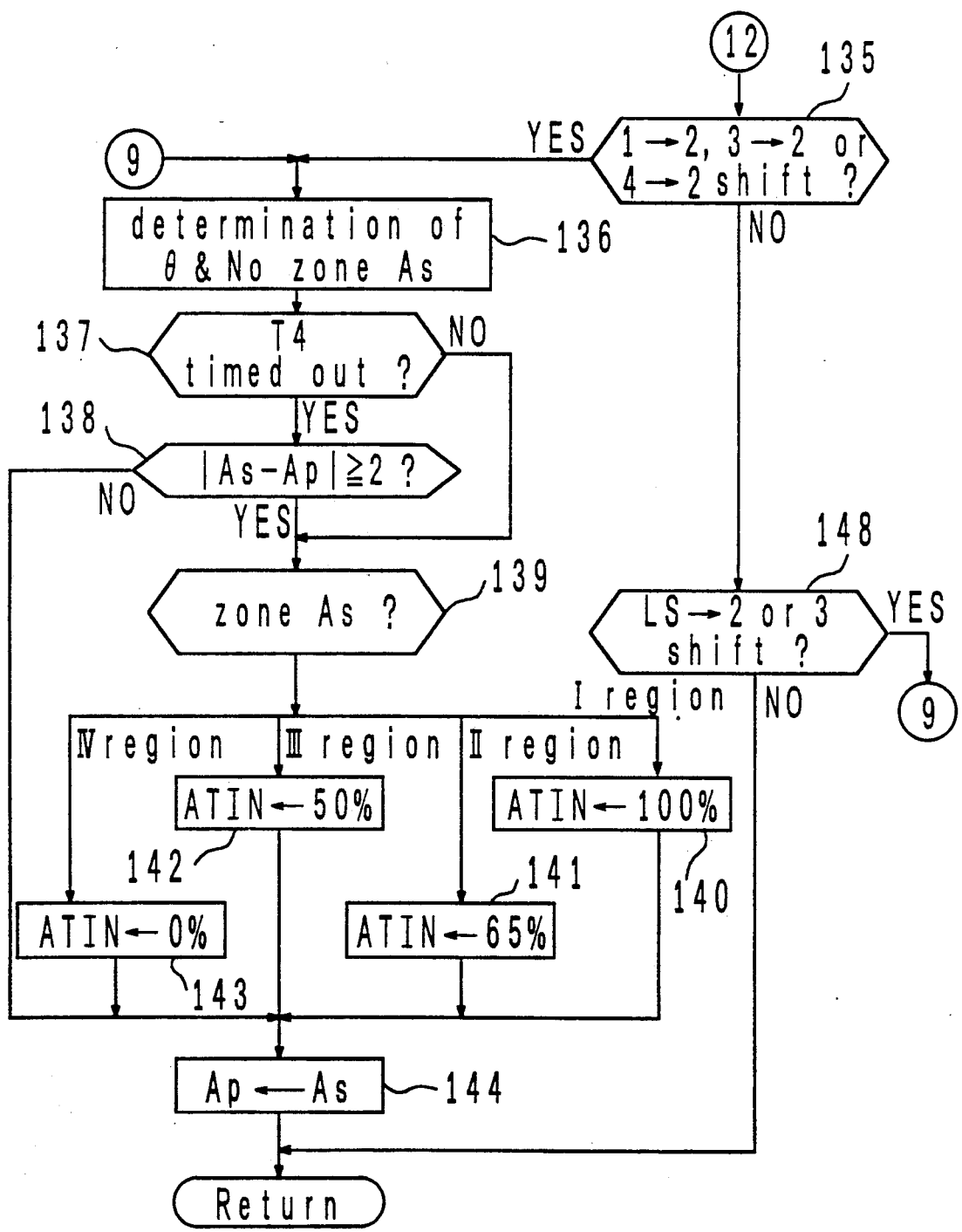
Figure 8C:
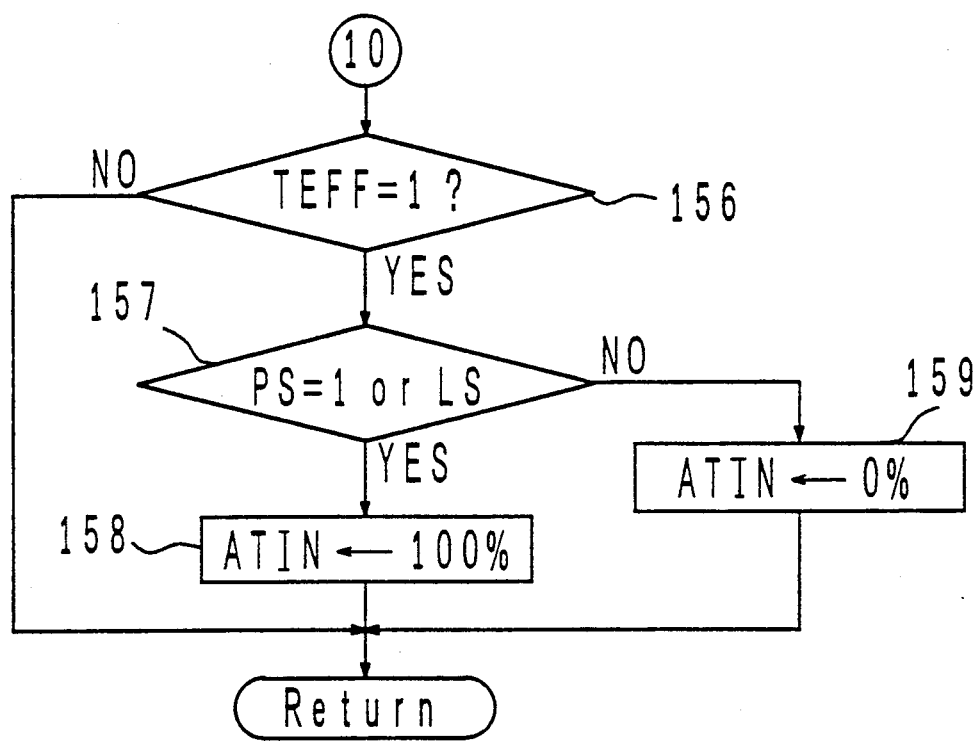

The detection (64) of the shift time (TSO, TSE) shown in FIG. 5d is illustrated in detail in FIGS. 6a and 6b, the control (65) of the linear solenoid valve SL6 shown in FIG. 5d is illustrated in detail in FIGS. 7a and 7b, and the control (67) of the timing solenoid valve SL5 shown in FIG. 5d is illustrated in detail in FIGS. 8a, 8b and 8c. Nomenclatures appearing in these Figures are described below.

LSF: A register for storing information representing the presence or absence of a command for the 1.5 speed range. When its content is "1", there is a command for the 1.5 speed range. Accordingly, "0" indicates the absence of such command.

PS: A current speed range register having a content which indicates a current speed range of the automatic transmission shown in FIG. 1, including a parking P, a back R, a neutral N condition, a first, a 1.5, a second, a third or a fourth speed range.

DS: A register for temporarily storing a speed range (a first, 1.5, a second, a third or a fourth speed range) which is determined by the shift decision to be established.

SS: A next speed range register for storing a speed range (a first, 1.5, a second, a third or a fourth speed range) which is to be established. A shift mode is determined by the content of the registers PS and SS.

SSN: A next following speed range register for storing a speed range which must be established following a shift operation from PS to SS.

TBF: A flag register indicating if the timer TB is or is not in operation. Its content "1" indicates that the timer is in operation, and "0" indicates no operation, or that the tiemr TB has not been started.

TEF: A flag register indicating if the timer TE is or is not in operation. Its content "1" indicates that the timer is in operation while "0" indicates no operation, or the timer TE has not been started.

PUF: A flag register indicating a power on up shift. Its content "1" indicates that this is an up shift or shift to a higher speed range under the condition that a vehicle drive load is applied to the engine while "0" indicates a down shift or a shift to a lower speed range or an up shift under no load condition upon the engine (power off, meaning that the vehicle is coasting or an engine brake is being applied).

TEIF: A flag register indicating the beginning of a shift time. Its content "1" indicates that it is now immediately after the timer has been started.

TEFF: A flag register indicating that it is now immediately after the termination of the shift period. Its content "1" indicates that it is now in a time interval which follows the time-out of the tmer TE, but is before a timer T2D times out.

i, j: A number of times register in which the number of times is entered that a power on condition (a vehicle driving load is applied to the engine) or not (power off) has been detected.

k: A number of times register for storing a number of times the inequality Nt1 > Nt2 applies (where Nt2 represents a current Nt while Nt1 represents the value of Nt which prevailed one TP previously), which is used in determining the beginning of a shift operation.

TTF: A flag register indicating the completion of the determination of the shift time. Its content "1" indicates that the determination of the shift time TT has been completed while "0" indicates that the determination of the shift time has not yet been completed.

TCR: A flag register indicating an abnormality of the shift time TT when it has a value of "1".

CR: A register into which data is entered indicating the degree of suitability of the shift time TT.

POI: A flag register indicating the need to establish an initial value for the duty cycle of the linear solenoid valve SL6, indicating the termination of establishing the initial value when it has a content of "1".

ADMEM: A register for storing a learned value of the duty cycle for the linear solenoid valve SL6.

ADIN: A register for storing a calculated value of the duty cycle for the linear solenoid valve SL6.

ATIN: A register for storing a calculated value of the duty cycle for the timing solenoid valve SL5.

The control operation of this embodiment will now be described in detail.

(1) Detection of Ne, Nt, No

Immediately after the ignition key switch IGS is closed, CPU in the control board 130 starts a program timer having three time limits (timers 1 to 3), enabling an interrupt operation responsive to a pulse generated by either pulse generator 140, 141, 142. For example, in response to the falling edge of a pulse generated by the generator 140, CPU enters an interrupt operation in which a count register 1 is incremented by one, followed by examining if the timer 1 has or has not timed out. If the timer has not timed out, CPU returns to a particular control operation which it assumed before entering the interrupt operation. If the timer 1 has timed out, the content of the count register is written into a register Nef used for calculating a speed Ne while the timer 1 is re-started and CPU returns to the previous control. In response to the falling edge of a pulse generated by the generator 141, CPU enters an interrupt operation in which a count register 2 is incremented by one, followed by examining if the timer 2 has or has not timed out. If the timer has not timed out, CPU returns to its control which it assumed before the interrupt operation is entered. If the timer 1 has timed out, the content of the count register 2 is written into a register Ntf for calculating a speed Nt. The timer 2 is re-started and CPU returns to its previous control. In response to the falling edge of a pulse generated by the generator 142, CPU enters an interrupt operation in which a count register 3 is incremented by one, followed by examining if the timer 3 has or has not timed out. If the timer has not timed out, CPU returns to its previous control which it assumed before entering the interrupt operation. If the timer 3 has timed out, the content of the count register 3 is written into a register Nof for calculating a speed No. the timer 3 is re-started and CPU returns to the previous control.

As a result of the execution of these interrupt operations, the number of pulses generated by the respective pulse generators 140, 141 and 142 during a latest given time limit is written into the registers Nef, Ntf and Nof. During data processing 2 (6) shown in FIG. 5a, CPU in the control board 130 calculates speeds Ne, Nt and No on the basis of data stored in the registers Nef, Ntf and Nof, representing the number of pulses generated in a given time limit, and write them into speed registers Ne, Nt and No, respectively. In this manner, the latest or updated speed data is maintained in these speed registers.

Figure 9A:
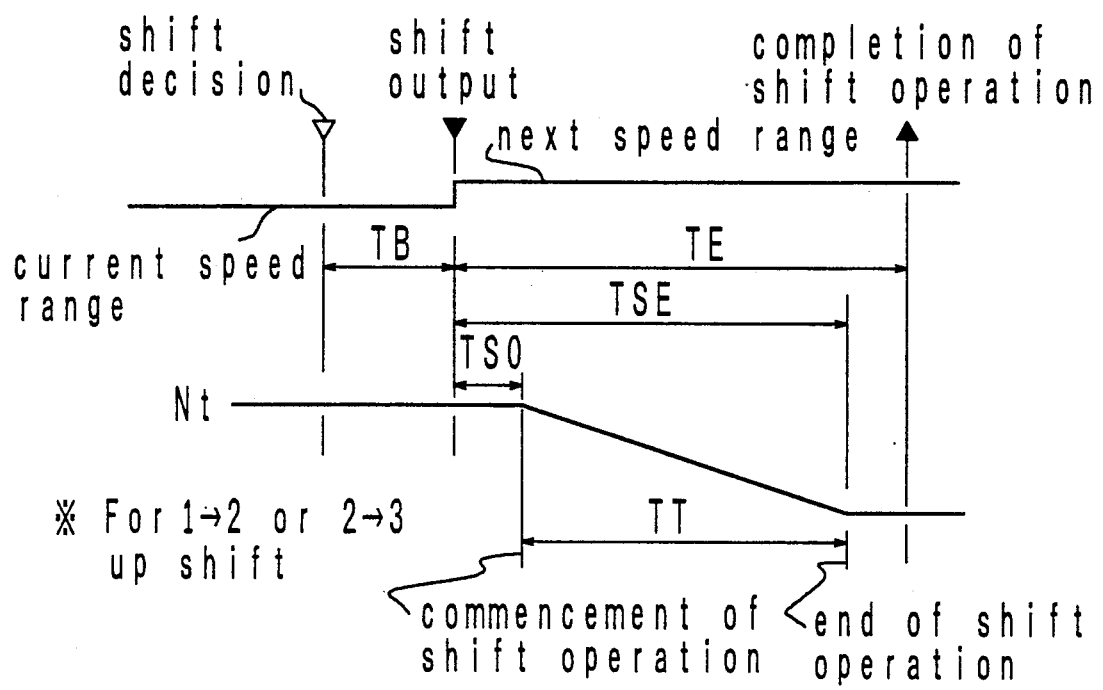
FIG. 9a is a timing chart indicating the timing of the determination of a shift operation, a shift output and the completion of a shift operation which are executed by the microcomputer in the control board 130 shown in FIG. 4.

(2) A summary of control timing from determining the need for a shift operation until the shift operation is completed For an up shift, the timer TB is started (19) when the need for a shift operation is determined, as indicated by a white triangle in FIG. 9a. When the timer times out, the energization of the solenoids SL1 to SL3 are switched so as to establish a next speed range (43 to 48). This timing is indicated by a black triangle in FIG. 9a, indicating "shift output". For example, for a 2→3 shift, the energization/deenergization of the solenoids SL1 to SL3 is controlled according to D-3 row shown in FIG. 3. The timer TE is then started (46).

In this embodiment, TB=0.2 sec. TE is chosen to be equal to 0.8 sec for a 4→3 down shift and equal to 1.5 sec for other up shifts and down shifts. Such TE value is chosen to be greater than a sum TSE of a time TSO which passes from the delivery of the shift output (48) to the initiation of the actual mechanical shift operation and a time TT from the initiation of the mechanical shifting to the completion thereof. It is to be noted that a mechanical shift time represents the actual shift time.

(3) Determination of mechanical shift time TT

A mechanical shift time TT varies with the abrasion of frictional members of the automatic transmission shown in FIG. 1 and with a loading associated with a running of the vehicle. If such time is too short, a shift shock is likely to occur. On the other hand, if such time is too long, a blow-up of the engine or a poor acceleration may result. In view of such drawbacks, the mechanical shift time is a measure of the merit of the automatic transmission.

In the present embodiment, for a 1→2 or 2→3 up shift, the determination of the mechanical shift time TT is made after starting the timer TE. The determination is illustrated in detail in FIG. 6a. Specifically, the initiation of a mechanical shift is determined to have occurred upon detecting a reduction in the speed Nt consecutively for two or more TP periods, and the determination of the mechanical shift time TT is initiated (81 to 87). A mechanical shift is determined to have been terminated in unit of TP period in response to a reduction of a new Nt value which is 2.5 rpm or more less than a previous Nt value. The value TT thus determined is written into the register TT (88 to 90) and 1 is written into the flag register TTF (91) in order to indicate the termination of the determination of the time TT.

Figure 10A:
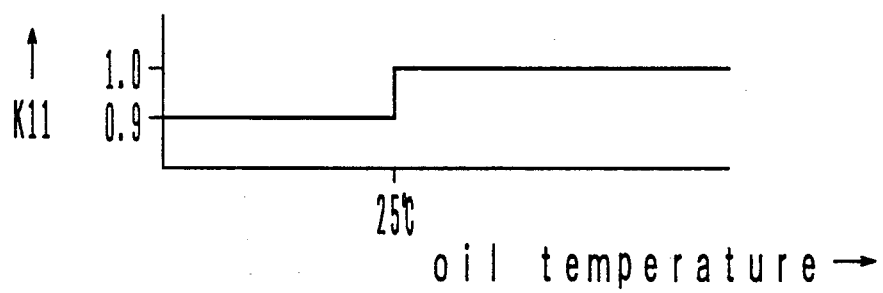
FIG. 10a graphically shows a correction factor K11 which is dependent on an oil temperature and which is used in the determination of the duty cycle shown in FIG. 7 (at 117 to 128)
Figure 10B:
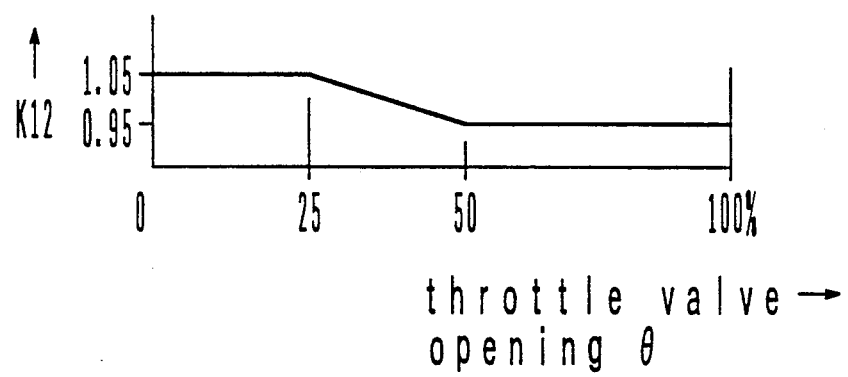
FIG. 10b graphically shows another correction factor K12, which is used in the determination of the duty cycle shown in FIG. 7 (at 117 to 128), as a function of the opening $\theta$ of the throttle valve.
Figure 10C:
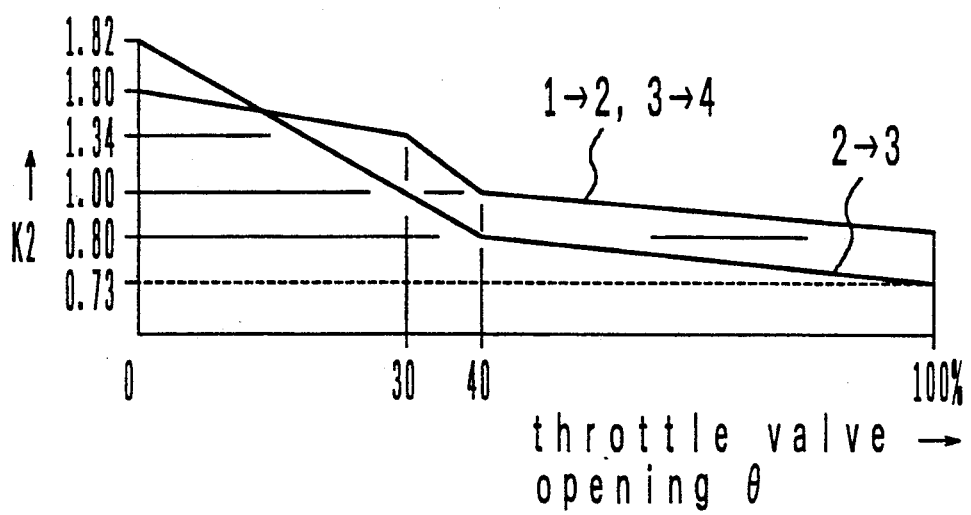
FIG. 10c graphically shows a correction factor K2, which is used in the determination of the duty cycle shown in FIG. 7 (at 117 to 128), as a function of the shift mode and the opening $\theta$ of the throttle valve.

(4) Detection of a failure in the transmission by means of the mechanical shift time TT When a loading associated with a running of the vehicle is abnormally high, when frictional members such as clutches or brakes in the automatic transmission shown in FIG. 1 are exposed to a greater degree of abrasion, when some kind of abnormality develops within a transmission mechanism or when the vehicle runs in an abnormal manner, or a failure or abnormality within the transmission mechanism is found, the mechanical shift time TT will become excessively long or excessively short, producing a high probability of causing a shift shock or a blow-up of the engine. To accommodate for this, in the present example, eight zones ① to ⑧ are determined about a basic shift time (fixed value) TS utilizing the throttle valve opening $\theta$ as a parameter, as shown in FIG. 10d. A shift time TT which is determined is examined to see in which zone it lies (92 in FIG. 6b), and if it lies in a zone ① or ⑧, 1 is written into the abnormality register TCR (103), indicating an abnormality (104) by energizing the lamp 151. If the shift time TT determined lies in a zone ② or ⑦, the number of times An such fact is found is counted. When the number of times An is less than 4, 2 is written into the degree of suitability register CR (99 to 102). When the number of times is equal to or greater than 4, an operation occurs in the similar manner as when the shift time lies in a zone ① or ⑧. When the shift time lies in a zone ③ or ⑥, the abnormality is cleared (96, 97), and 1 is written into the degree of suitability register CR (98). Also when the shift time lies in a zone ④ or ⑤, the abnormality register is cleared (93, 94), and O is written into the degree of suitability register CR (95), by clearing this register. Accordingly, data in registers CR and TCR represent the degree of suitability of a shift time.

(5) Multiple shift

If there is a change in the throttle valve opening or the vehicle speed No during a time interval (TB+TE) from the decision of a need for a shift operation until the shift operation is actually completed, it may become necessary to shift to a speed range which is different from the speed range updated during the interval (TB+TE).

When the need for a shift operation is determined during an interval TB, meaning the time interval from starting the timer TB until it times out, a speed range which is found necessary to be established is written into the next speed range register SS (23 in FIG. 5b). As a result, the speed range which had been written into the register SS immediately before the TB interval occurs is now erased as a result of this writing, and hence the shift output available for the speed range when the timer TB times out (48 in FIG. 5c) is effective to establish a speed range which is determined during the TB interval.

If the need for a shift operation is determined during the shift time or during the time the timer TE is in operation, as indicated by TEF=1, subsequent to the TB interval (15 - 16 - 17), it is to be noted that the immediately preceding shift operation has been completed. Accordingly, the speed range which is to be established next is written into the next following speed range register SSN (36), and as the timer TE times out, a shift output for causing the speed range for which the need of a shift operation is found is delivered (41 - 42 - 55 - 56

- 57 - 58 - 44 to 48). In other words, the shift to the speed range takes place immediately following the previous TE, without interposing another TB interval.

(6) Determination of power on up shift

A shift shock is likely to occur during a shift (TE) in the power on up shift, and a blow-up of the engine is likely to occur during a power off up shift. Accordingly, during an up shift (TE), the rate at which the oil pressure is changed is determined in a manner corresponding to power on/off, thus preventing the occurrence of a shift shock or an engine blow-up. At this end, the detection of a power on/off is necessary. This preferably takes place immediately before the shift (TE) since the throttle valve opening $\theta$, vehicle speed No, the number of revolutions of the engine Ne and the number of revolutions Nt of the output shaft of the subtransmission 2 change from time to time. Accordingly, in the present embodiment, the detection of power on/off is made during the TB interval (16 - 23 to 35). It is to be noted that the decision of the power off also takes place during the TE interval (17 - 36 - 30 to 35).

Specifically, if Ne≧Nt applies during the TB interval (TBF=1) when the shift mode is an up shift, the content of the number of times register i is incremented by one (16 - 23 - 24 - 27 - 28 - 29). If the content of the register i is equal to or greater than 2, 1 representing the power on up shift, is written into the flag register PUF (31). If this is in the TB or TE interval, the content of the number of times register j is decremented by one when Ne<Nt applies (32, 33), and when the content of the register j is equal to or greater than 2, the flag register PUF is cleared (35). When it is cleared, this means that the power off mode prevails. In this manner, when the shift mode is an up shift, the power on or off is determined consecutively until the timer TB times out, whereupon the power off is determined. When the power on is determined, the content of the register PUF is established to be equal to 1 while it is equal to 0 if the power off is determined. Accordingly, when delivering the shift output (48), information indicating if the power on prevails or not is stored in the register PUF.

(7) Steady-state control of the duty cycle for the linear solenoid SL6 (FIGS. 7a and 7b)

Figure 9B:
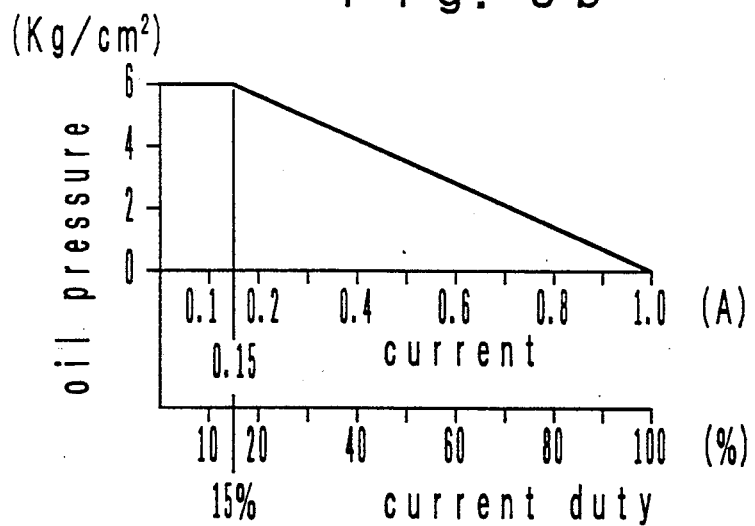
FIG. 9b graphically shows an oil pressure which is output from the linear solenoid valve SL6 against the current level which is used to energize the coil thereof.

The linear solenoid SL6 develops an oil pressure which is substantially proportional to the magnitude of the current flow through its electrical coil, and an oil pressure which is proportional to this oil pressure is applied by the accumulator pressure control valve 110 as the piston back pressure to the accumulators 260 to 290. The relationship between the magnitude of the current flow through the linear solenoid SL6 and the back pressure on the piston of the accumulators 260 to 290 is shown graphically in FIG. 9b. In this embodiment, the magnitude of a current flow through the linear solenoid SL6 is determined by the duty cycle. The relationship between the duty cycle and the average current flow is indicated also in FIG. 9b.

The linear solenoid SL6 is used as a substitute for a conventional throttle valve used in the conventional hydraulic circuit which is mechanically coupled to the rotary shaft of a throttle valve and is responsive to a governor pressure which is in turn dependent upon the rotational speed of the engine to regulate a line pressure to a value corresponding to the throttle valve opening and the governor pressure. At a given timing, principally during TE interval, in a particular shift mode, CPU in the control board 130 controls the duty cycle for controlling the back pressure as mentioned in the next following paragraph (8) in order to control the back pressure of the accumulators 260 to 290 to thereby prevent the occurrence of a shift shock. However, at other times, CPU causes an energization at a current level (or with a corresponding duty cycle) as shown in FIG. 9c in a manner corresponding to the throttle valve opening $\theta$ and the rotational speed Nt of the output shaft of the subtransmission 2. Specifically, a pressure which corresponds to the throttle valve opening $\theta$ and the rotational speed Nt is applied to the accumulators 260 to 290 and the 2→3 shift valve 60 (115, 116 in FIG. 7a).

(8) The back pressure control of accumulators during a shift operation (FIG. 7)

For a 1→2, 2→3 or 3→4 power on up shift (PUF=1), in order to prevent the occurrence of a shift shock, during the shift interval (TE: see FIG. 9a), if it now prevails, the duty cycle of the linear solenoid SL6 or the back pressure on the piston of the accumulators 260 to 290 is substantially determined as follows:

$$K1 \times K2 \times [K3(1-TT/TS)+ADMEM]$$

where K1 represents an environmental change correction factor and is given by K1=K11+K12 where K11 represents an oil temperature correction factor and K12 a correction factor corresponding to the throttle valve opening, K2 is a correction factor corresponding to the shift mode and the throttle valve opening, and K3 is a correction factor corresponding to the shift mode. The values of these correction factors are shown in FIGS. 10a, 10b, 10c and 10d. The correction factor K11 is calculated in a manner corresponding to the temperature detected by the oil temperature sensor 136 (118 in FIG. 7b). The correction factor K12 is calculated in a manner corresponding to the throttle valve opening $\theta$ (118). The correction factor K2 is calculated in a manner corresponding to the throttle valve opening $\theta$ and the shift mode (120). The correction factor K3 corresponds by a one-to-one relationship to the shift mode, and hence a value corresponding to the shift mode or the content of the registers PS and SS is selected.

TT represents the latest mechanical shift time TT, or data which is detected by the flow chart shown in FIG. 6a and stored in the register TT while TS represents a basic shift time (fixed value). ADMEM represents the duty cycle which is determined by the correction which takes place as a result of learning effect.

In calculating $$K1 \times K2 \times [K3(1-TT/TS)+ADMEM]$$

mentioned above, CPU in the control board 130 calculates this as follows. Initially, the learned value ADMEM or the content of the register ADMEM, is modified into a proper value [K3 (1−TT/TS)+ADMEM] in a manner corresponding to the latest mechanical shift time TT and the prevailing shift mode, and is then written into register ADMEM to update it (126). The current environmental factor K1 (=K11+K12) and the correction factor K2 are multiplied by the data stored in the register ADMEM, and the product is delivered as an output duty cycle to be written into an output data register ADIM which is directed to the linear solenoid SL6 (128). During the output control (68 in FIG. 5d), CPU in the control board 130 delivers an on/off signal having the duty cycle represented by data stored in the output data register ADIM to the solenoid driver which is associated with the energization of the solenoid SL6.

When the batteries 163 and 164 are connected to the control board 130, the control board 130 is fed with a power supply, and subsequently when the ignition key switch IGS is closed, a control over the automatic transmission shown in FIG. 1 is enabled for the first time. When so enabled, there is no learned value ADMEM for the duty cycle of the linear solenoid SL6. Accordingly, the content of register POI is now 0. Accordingly, when the content of the register POI is equal to 0, an initial value (fixed value) is written into the register ADMEM to write 1 into the register POI, indicating that the initial value has been established (122, 123). Since the learned value must not be updated (126) at this time, no updating takes place, and ADMEM multiplied by the environmental factor is used to determine the duty cycle (124).

As mentioned above under the paragraph (4), in the event a failure is present within the transmission, the shift time TT will be displaced from the reference value TS. Accordingly, the modification of the learned value for the duty cycle (126) is inappropriate. Hence a reference is made to the degree of suitability of the shift time TT (the content of the registers TCR and CR), and if the shift time TT lies in either one of the zones ①, ⑧, ②, or ⑦ (FIG. 10d), a modification of the learned value (126) is not made, but the prevailing duty cycle (ADMEM) is corrected by an amount corresponding to a change in the environment to determine the duty cycle for the linear solenoid SL6 (125-128). Thus, only when the shift time TT lies in one of zones ③ to ⑥, a modification of the learned value of the duty cycle is made. This assures a smooth automatic pressure regulation (or correction of the duty cycle) as a time sequence only within a proper range of the shift response (TT) of the automatic transmission so as to bring the shift time TT closer to the proper value TS.

FIG. 11a graphically shows a change, in a time sequence, in the oil pressures of the brake $B_1$ and the clutch $C_2$ during a 2→3 shift. In this Figure, the oil pressure of the brake $B_1$ is shown in solid line for power on and in broken lines for power off. The oil pressure of the clutch $C_2$ for power on is shown in a thick solid line, in two dots and single dot lines while the oil pressure during the power off is not shown.

Depending on the duty cycle of the linear solenoid which is achieved by the back pressure control of the accumulator which is executed only during the power on, the oil pressure of the clutch $C_2$ rises rapidly and the shift time TT will be short as indicated by two-dots lines when the duty cycle is low. On the contrary, for a high duty clcle, the rising of the oil pressure of the clutch $C_2$ takes place slowly, as indicated by single dot line, causing an increase in the shift time TT. During the power off, the duty cycle is rendered to be equal to 0 during the shift operation, and accordingly the oil pressure of the clutch $C_2$ rises most rapidly, and the neutral interval shown will be reduced than that shown in the drawing.

It will thus be seen that the mechanical shift time TT depends on the duty cycle, assuming a longer value for a higher duty cycle and assuming a shorter value for a lower duty cycle. During the back pressure control of the accumulator, a correction $+K3$ (TS−TT)/TS, or a correction corresponding to a deviation of the actual shift time TT relative to the reference value TS is added to the previous duty cycle to provide the next duty cycle (126 in FIG. 7), thus performing a modification of the learned value. In this manner, the mechanical shift time TT converges to the reference value TS. In this manner, the duty cycle is automatically adjusted in accordance with a change in the engaging responses of the frictional members such as the brake ($B_1$) and the clutch ($C_2$) due to their abrasion to maintain the shift time virtually at the reference value TS, thus preventing the occurrence of a shift shock.

(9) Control of timing solenoid SL5 during shift operation (FIGS. 8a, 8b and 8c)

The timing solenoid SL5 determines the rate at which the oil pressure applied to the brake $B_1$ for its engagement rises and the rate at which the oil pressure of the brake $B_1$ falls as it is released. The brake $B_1$ is engaged only in the second speed range (see FIG. 3), and accordingly, the rising or falling rate of the oil pressure of the brake $B_1$ is controlled in a shift mode which relates to the oil pressure of the brake $B_1$, thus preventing the occurrence of a shift shock.

For a 2→3 shift shown in FIG. 11a, the timing solenoid SL5 continues to be turned off for the power on (131 - 132 - 135 - 145 - return in FIG. 8a), whereby the bypass valve 80 causes the oil path which bypasses the orifice 82 to be closed. Accordingly, since the brake $B_1$ communicates with the 2→3 shift valve 60 which connects it to the drain (low pressure) through the orifices 81 and 82, the rate at which the brake $B_1$ is decompressed is low. If a change from the power on (PUF=1) to the power off (PUF=0) occurs during a time interval after the TE interval is entered and until 0.1 sec passes thereafter, CPU in the control board 130 turns on the timing solenoid SL5 when the timer T1 times out (132 - 145 to 147: a rising shown in broken lines and occurring 0.1 sec later shown in the SL5 line in FIG. 11a). Specifically, data specifying a duty cycle of 100% is written into the output register ATIN associated with the timing solenoid SL5 (147). The time limit T1 (0.1 sec) may be changed to different values in a range from 0.1 to 0.3 sec. When the timing solenoid SL5 is turned on, the bypass valve 80 opens the oil path which bypasses the orifice 82, so that the brake $B_1$ will be decompressed at a higher rate. When the TE interval passes, the timing solenoid SL5 is turned off or its duty cycle is changed to 0% (131 - 149 - 156 in FIG. 5b - 157 - 159). In FIG. 11a, a change in the pressure of the brake $B_1$ during the power on is shown in solid line. At the output (68 in FIG. 5d), CPU in the control board 130 refers to data stored in the output register ATIN associated with the timing solenoid SL5, and delivers an on/off signal having the duty cycle indicated by such data to the solenoid driver associated with the solenoid SL5.

During a 2→3 shift, if this is the power off, CPU in the control board 130 turns on the timing solenoid SL5 (to the duty cycle of 100%) upon entering the TE interval (134) and turns it off (to the duty cycle of 0%) after the TE interval has passed (131 - 149 - 156 in FIG. 5b - 157 - 159).

The timing for energizing the timing solenoid SL5 during a shift to the second speed range with the power on is illustrated in FIG. 11c. During a shift to the second speed range, the throttle valve opening $\theta$ and the rotational speed No of the output shaft of the main transmission 3 are examined to determine in which one of regions I to IV and non-controlled region, both shown in FIG. 11b, their combination lies during an interval A which covers a time interval of 0.4 sec upon entering the TE interval (131 - 132 - 135 to 139). If the combination is found to lie in region I, the duty cycle for the timing solenoid SL5 is chosen to be 100% (140). The duty cycle will be chosen to be 65% when the combination lies in the region II (141), to 50% for region III, and 0% (off) for region IV (142). FIG. 11d shows an actual demarcation of the regions I to IV, and FIG. 11e graphically shows the relationship between the region in which the combination is determined to lie and the corresponding duty cycle. In an interval B (FIG. 11c) which lies in the TE interval but the initial 0.4 sec has passed, a determination is made in which one of the regions I to IV and non-controlled region shown in FIG. 11b (or more exactly, FIG. 11d) the combination of the throttle valve opening θ and the rotational speed No of the output shaft of the main transmission 3 lies. A difference, expressed in terms of such region, between a region As which is determined to contain the combination and a region Ap which was previously determined, is examined (138). If the difference corresponds to two regions or greater, the duty cycle is determined so as to correspond to the new region As (139 - 140 to 143). If the difference expressed in terms of the regions is equal to 1 or less, the duty cycle remains unchanged (133 - 144). A change in the pressure of the brake $B_1$ which results from such duty cycle control is illustrated graphically in FIG. 11f.

For the power off up shift, the timing solenoid SL5 is turned on (to the duty cycle of 100%) for a 2→3 or 2→4 shift (132 - 145 - 146 - 133 - 134).

For a 2→1 shift, the timing solenoid SL5 is maintained off (or to the duty cycle of 0%) until the completion of the shift operation or until the TE interval passes, and the timing solenoid SL5 is turned on (to the duty cycle of 100%) upon completion of the shift operation, as graphically illustrated in FIG. 11g. Accordingly, the oil pressure of the brake $B_2$ will assume a high value for transmitting the maximum torque used in the first speed range after TE (1.5 second). Since the oil pressure is changed to one used in the first speed range at TE after the shift operation, the oil pressure of the brake $B_2$ is low immediately after the shift operation or within the TE interval, preventing the occurrence of a shift shock.

(10) Control of energization of the timing solenoid SL5 upon changing the shift lever from D or S position to L position (FIG. 8a)

When the shift lever changes from D or S position to L position, CPU in the control board 130 writes 1 into a manual shift detecting register, and starts a timer T20a having a time limit T20a (2 sec) (131 - 149 - 150 - 151). When the timer times out, CPU turns the timing solenoid SL5 on (to the duty cycle of 100%), and clears the manual shift detecting register (131 - 149 - 150 - 152 - 153 to 155). As a result of this, upon changing the shift lever from D or S position to L position, the oil pressure of the brake $B_2$ will rise to a value for transmitting the maximum torque used in the first speed range after T20a (2 seconds) thereafter. Since the oil pressure ff the brake $B_2$ has been maintained low until that time, no shock results from a change in the oil pressure. The occurrence of a shift shock is also prevented if a shift to the first speed range occurs in connection with changing the shift lever to L position.

(11) Shift control relating to 1.5 speed range (LS)

The first to the third speed range is established by maintaining the subtransmission 2 low (SL3: off; the term "high/low" refers to a range of rotational speed of the output shaft of the subtransmission 2, and "low" corresponds to a high gear ratio) and by a speed range established in the main transmission 3 which is determined by the combination of on/off of the solenoids SL1 and SL2. The fourth speed range (O/D) is determined by maintaining the subtransmission 2 high (SL3: on, corresponding to a low gear ratio) and establishing the third speed range (SL1, SL2: off) in the main transmission 3. Accordingly, a shift between the first to the third speed range actually means a switching between speed ranges of the main transmission 3 (single change shift).

However, 1.5 speed range is determined by maintaining the subtransmission 2 high (SL3: on) and by establishing the first speed range in the main transmission 3 (SL1: off/SL2: on). Accordingly, a shift between 1.5 speed range on one hand and the second and the third speed range on the other hand is a double change shift requiring the switching of both the main transmission 3 and the subtransmission 2.

1→1.5 shift

FIG. 12a shows the timing of controlling the solenoids during a 1→1.5 shift. In this shift mode, the main transmission 3 remains in the first speed range while the subtransmission 2 is switched from its low condition (SL3: off) to its high condition (SL3: on), thus representing a single change shift. During this shift mode, the timing solenoid SL5 continues to be turned on (to the duty cycle of 100%). The solenoids SL1 to SL3 are changed from their on/off setting which is used to establish the first speed range to that which establishes 1.5 speed range (see FIG. 3) upon entering the TE interval or when the timer TB has timed out. Specifically, SL3 is changed from its off to its on condition.

The linear solenoid SL6 is energized with a duty cycle or with a current value shown in FIG. 9c which corresponds to the throttle valve opening θ and the rotational speed Nt of the output shaft of the subtransmission 2 until the end of the TB interval, but upon entering the TE interval, the duty cycle is fixed to a value which prevailed immediately before. In other words, the energization takes place with a fixed duty cycle during the TE interval.

1.5→2 shift

FIG. 12b shows the timing of controlling the solenoids during a 1.5→2 shift. This shift mode represents a double change shift in which the main transmission 3 is changed from the first to the second speed range and the subtransmission 2 is changed from its high to the low condition. During this shift mode, the timing solenoid SL5 is turned off (to the duty cycle of 0%) at a time when this shift is determined (15 to 22 in FIG. 5b), and when the TB interval has passed, a determination of the particular region in which the combination lies is made as mentioned previously with reference to FIG. 11b, and the solenoid is energized with a duty cycle corresponding to the region thus determined (148 - 136 to 144 in FIG. 8b). The linear solenoid SL6 is controlled in the similar manner as in the 1→1.5 shift mentioned above.

The shift solenoids are changed in this shift mode as follows: SL1: off, SL2: on, SL3: on (these conditions prevail in the 1.5 speed range) to SL1: on, SL2: on, SL3: off (these conditions prevail in the second speed range). Upon entering the TE interval, CPU in the control board 130 initially turns on both solenoids SL1 and SL2 in preparation to establishing the second speed range, but retards the switching of the solenoid SL3 to its off condition. Subsequently, CPU calculates a difference or mismatch between the main transmission and the subtransmission from their synchronization $\Delta N = Nt - 1.53$ No between the rotational speed Nt of the output shaft of the subtransmission 2 and a rotational speed 1.53 No which will be produced at the input shaft of the main transmission 3 (or the output shaft of the subtransmission 2) when it is at No. On the other hand, CPU selects a reference value (Gmap value: FIG. 13) having the rotational speed No as a parameter and turns the solenoid SL3 off at the time (point X) when the inequality $\Delta N \leq Gmap$ applies in order to establish the second speed range. FIG. 13a shows values of Gmap.

In the 1.5 speed range, the subtransmission 2 is maintained high in the similar manner as in O/D (the fourth speed range) and the main transmission 3 is determined in the same manner as in the first speed range. Accordingly, a 1→1.5 shift and a 1.5→1 shift can be achieved by merely changing the subtransmission from its low to its high condition or conversely. However, a 1.5→2 shift or a 1.5→3 shift requires that the subtransmission 2 be changed from its high to its low condition and that the main transmission be changed from the first to the second or the third speed range, thus giving rise to the likelihood that shift shocks may be developed in two steps (for each of the two transmissions). Accordingly, during the 1.5→2 shift, the solenoid SL3 is turned off at the time (point X) when $\Delta N \leq Gmap$ applies in order to establish the second speed range. The purpose of this is to achieve a substantial synchronization of the completion of shift operations in both the subtransmission 2 and the main transmission 3.

FIG. 13b graphically shows the timing chart for the 1.5→2 shift in more detail. In the 1.5→2 shift, when the solenoid SL3 is turned off at the $\Delta N$ value shown in FIG. 13c (it will be noted that since SL1 is on as is SL2, turning SL3 off establishes the second speed range), shift operations in the main transmission 3 and the subtransmission 2 will be completed in substantially synchronized manner, thus preventing the occurrence of shift shocks. $\Delta N$ value which achieves such synchronizing characteristic has No as a parameter as indicated in FIG. 13c, and Gmap has a value which is close to $\Delta N$ value as indicated in the rightmost column of FIG. 13c (and FIG. 13a). Since the point X at which the solenoid SL3 is turned off is chosen so that the actual value of $\Delta N$ is not greater than Gmap value (reference value), it follows that shift operations in the main transmission 3 and the subtransmission 2 are completed in substantially synchronized manner, substantially preventing the occurrence of shift shocks.

1.5→3 shift

This shift mode is a double change shift, requiring changing the main transmission 3 from the first to the third speed range and changing the subtransmission 2 from its high to its low condition. Such control is similar to the control which is used during the 1.5→2 shift mentioned above, but in this shift mode, it is chosen that $\Delta N = Nt - 1.00 \times No$.

1.5→4 shift

Figure 12C:
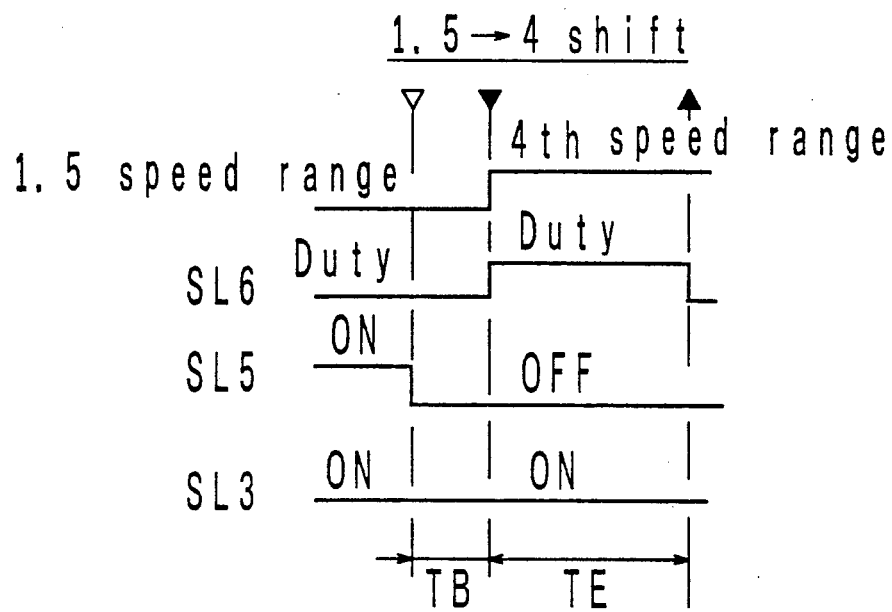

The control timing during this shift mode is schematically shown in FIG. 12c. This shift mode is a single change shift in which the main transmission 3 is changed from the first to the third speed range while the subtransmission 2 is maintained high. When the need to choose this shift mode is found, the timing solenoid SL5 is turned off (to the duty cycle of 0%) upon starting the timer TB (15 to 22 in FIG. 5b), and is maintained off after the completion of the shift operation or upon termination of the TE interval. The on/off condition of the solenoids SL1 to SL3 are changed upon entering the TE interval. The control of the duty cycle of the linear solenoid SL6 remains the same as in the 1→1.5 shift mentioned above.

1.5→1 shift

Figure 12D:
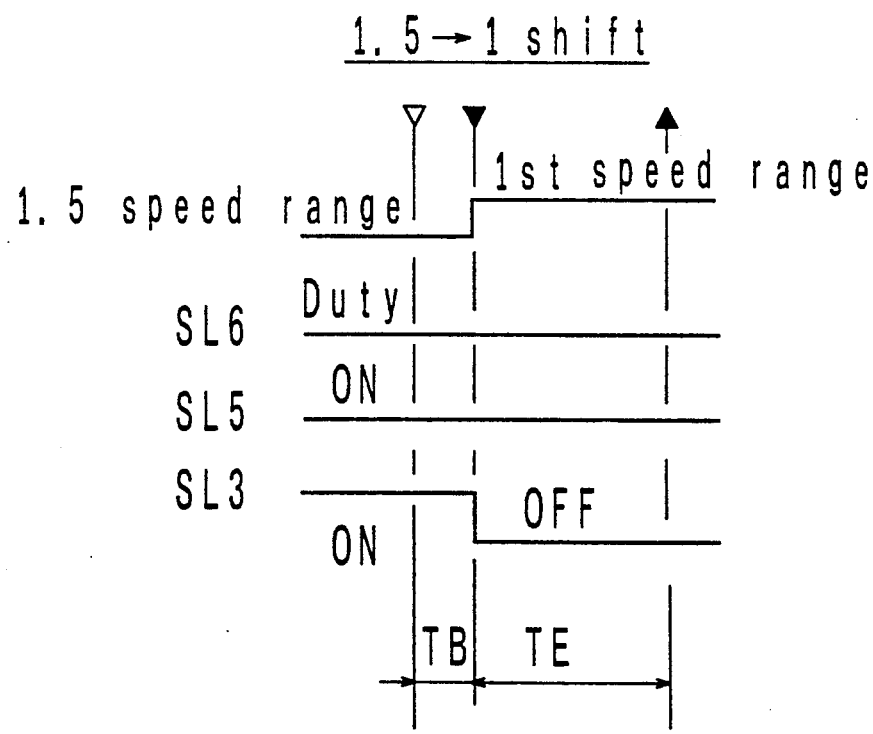

The control timing during this shift mode is shown in FIG. 12d. This shift mode is again a single change shift in which the subtransmission 2 is changed from its high to its low condition while the main transmission 3 continues to operate in the first speed range. In this shift mode, the timing solenoid SL5 continues to be turned off (to the duty cycle of 0%), while the on/off condition of the solenoids SL1 to SL3 are changed to those used during the first speed range upon entering the TE interval. The linear solenoid SL6 is energized with a duty cycle or current value shown in FIG. 9c which corresponds to the throttle valve opening $\theta$ and the rotational speed Nt of the output shaft of the subtransmission 2 during the TE interval also.

2→1.5 shift

Figure 12E:
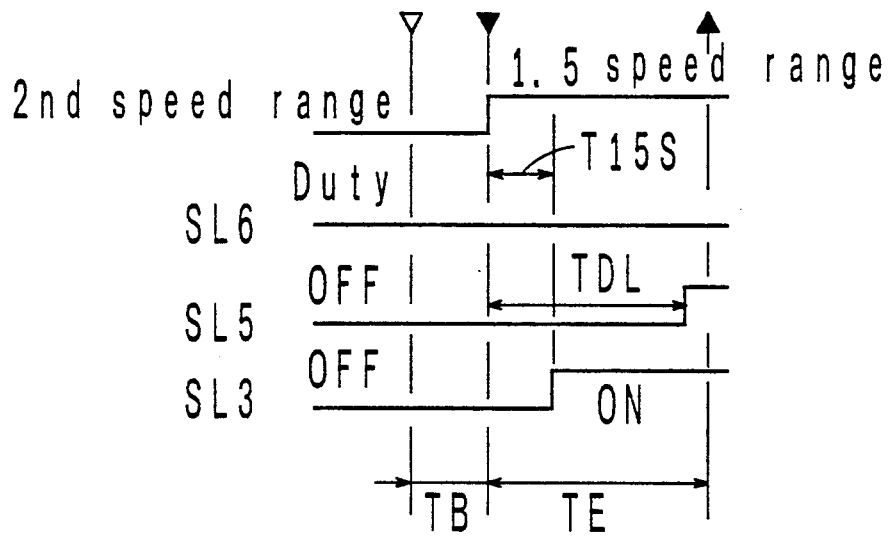

The control timing during this shift mode is shown in FIG. 12e. This shift mode is a double change shift in which the main transmission 3 is changed from the second to the first speed range while the subtransmission 2 is changed from its low to its high condition. In this shift mode, upon entering the TE interval, the on/off condition of the solenoids SL1 and SL2 are changed from those associated with the second speed range to those associated with the 1.5 speed range (even though those used in the first speed range are used as far as the main transmission 3 is concerned), but the solenoid SL3 is changed from off to high condition (or from low to high in the subtransmission 2) only after T15S (0.4 sec) has passed or only after the timer T4 (0.4 sec) which is started at step 49 in FIG. 5c has timed out. In other words, upon entering the TE interval, the first speed range is initially established, and the 1.5 speed range is established at T15S thereafter. The timing solenoid SL5 continues to be turned off (to the duty cycle of 0%) until TDL (2 sec) passes upon entering the TE interval, whereupon it is turned on (to the duty cycle of 100%). The linear solenoid SL6 is energized with the duty cycle or current value shown in FIG. 9c which corresponds to the throttle valve opening $\theta$ and the rotational speed Nt of the output shaft of the subtransmission 2 during the TE interval also.

3→1.5 shift

Figure 12F:
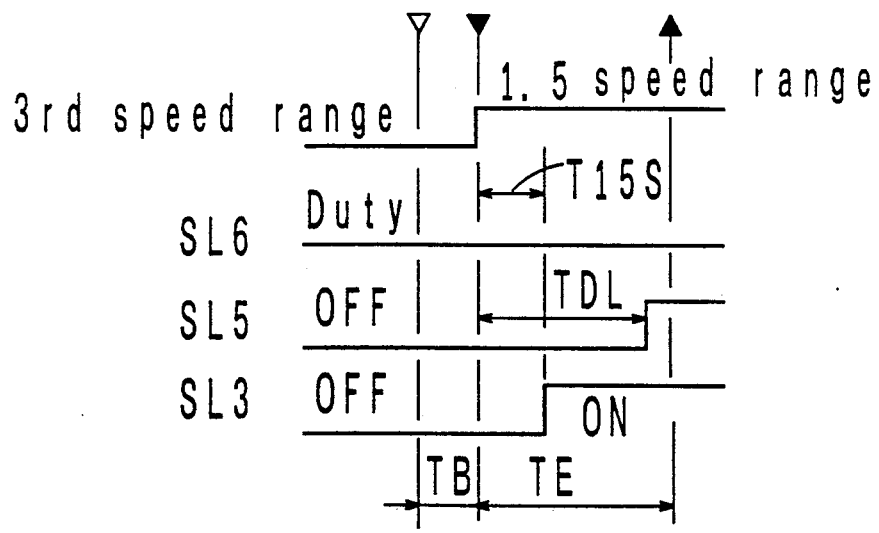

The control timing during this shift mode is schematically shown in FIG. 12f. This shift mode is a double change shift in which the main transmission 3 is changed from the third to the fourth speed range while the subtransmission 2 is changed from its low to its high condition. The detail of the control is similar to the control used during 2→1.5 shift.

4→1.5 shift

Figure 12G:
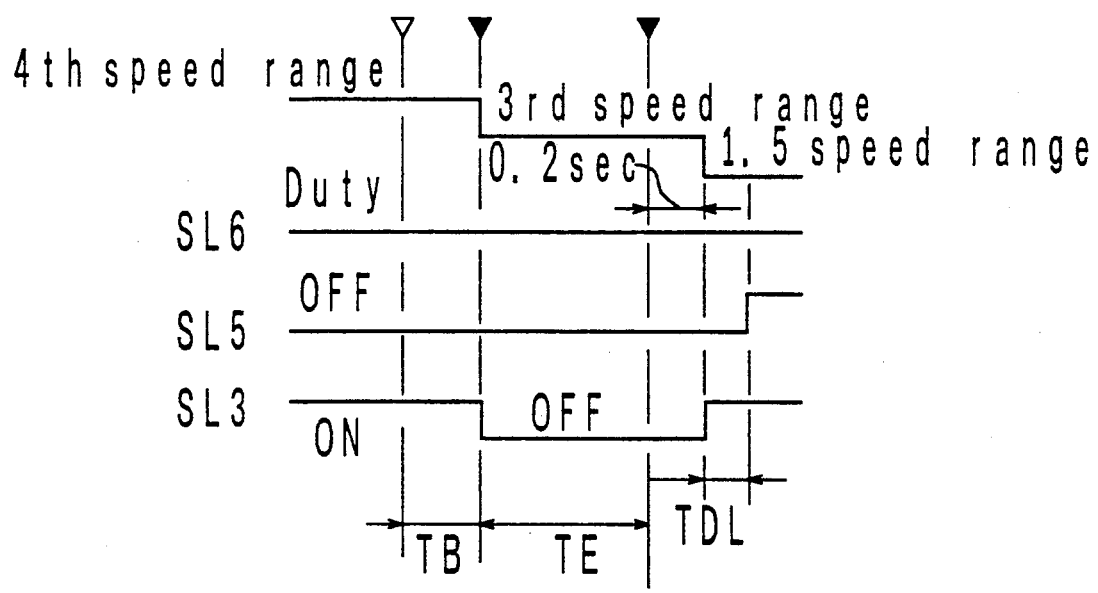

The control timing during this shift is shown in FIG. 12g. Even though this shift mode is a single change shift in which the main transmission 3 is changed from the third to the fourth speed range while the subtransmission 2 is maintained high, this is achieved by initially changing from the fourth to the third speed range (by changing the subtransmission 2 from its high to its low condition, or equivalently changing the solenoid SL3 from its on to its off condition), as illustrated in FIG. 12g. When the TE interval passes, timer T2 (0.2 sec) and timer T2D (0.2→TDL sec where TDL represents a delay time) are started (55 to 63 in FIG. 5c). When the timer T2 times out, the 1.5 speed range is established (70 to 79 in FIG. 5e). Specifically, the solenoid SL3 is changed from its off to its on condition, and the solenoid SL2 from its off to its on condition. In other words, the subtransmission 2 is changed from its low to its high condition and the main transmission 3 is changed from the third to the first speed range. The timing solenoid SL5 continues to be turned off (or the duty cycle of 0%) until the timer T2D times out, whereupon it is turned on (to the duty cycle of 100%) (72 to 76 in FIG. 5e). ATIN represents the output register associated with the solenoid SL5. The linear solenoid SL6 is energized with the duty cycle or a current level shown in FIG. 9c which corresponds to the throttle valve opening $\theta$ and the rotational speed Nt of the output shaft of the subtransmission 2 during the shift operation.

(12) Steady-state lockup control

In the lockup control (67) shown in FIG. 5d, when the solenoid SL4 is off or the lockup, in which the directly coupled clutch 50 is engaged and solenoid SL4 is on, is not activated, a particular reference vehicle speed data group having the throttle valve opening $\theta$ as a parameter is specified in order to determine the activation of the lockup dependent upon an involved speed range, provided the shift lever is in its D position and the brake switch 137 is turned off, meaning that the brake pedal is not depressed. From this data group, particular reference vehicle speed data is specified which corresponds to the current throttle valve opening $\theta$, and the current vehicle speed No is examined if it is equal to or greater than the reference vehicle speed data. If the current vehicle speed No is found to be equal to or greater than the reference vehicle speed data, this means that there is a need to activate the lockup. Accordingly, the lockup is activated by energizing the solenoid SL4. However, in order to prevent any shock from resulting from the lockup, the duty cycle of the solenoid SL4 is increased stepwise as shown in FIG. 14a. Specifically, when the need for the lockup is found, a duty cycle Dt1 corresponding to the current throttle valve opening $\theta$ is determined and is written into the output register ALIN. The relationship between the opening $\theta$ and the duty cycle Dt1 is graphically shown in FIG. 14b. Timers TLB (0.4 sec) and TLON (1.0 sec) are started. Subsequently, the same duty cycle is maintained until the timer TLB times out, provided the lockup condition prevails. When the timer TLB times out, a duty cycle Dt1 (FIG. 14b) corresponding to the throttle valve opening $\theta$ which then prevails is again calculated, and the duty cycle is updated to this new calculated value. When the timer TLON times out, the duty cycle is changed to 100%. This completes the lockup activation control for engaging the directly coupled clutch 50.

During the lockup and during the lockup activation control, the current vehicle speed No is monitored if a condition to terminate the lockup applies. Specifically, a particular reference vehicle speed data group having the throttle valve opening as a parameter is specified in order to determine the termination of the lockup dependent upon the particular speed range. Particular reference vehicle speed data which corresponds to the current throttle valve opening $\theta$ is specified among this data group, and the current vehicle speed No is examined if it is equal to or less than the reference vehicle speed data. In the event the current vehicle speed No is equal to or less than the reference vehicle speed, the lockup must be terminated. Accordingly, the solenoid SL4 is turned off (or the duty cycle of 0%). At this end, data specifying a duty cycle of 0% is written into the output register ALIN associated with the solenoid SL4. However, in order to prevent a hunting between the activation and the termination of the lockup, the determination of the necessity to terminate the lockup is not executed during an interval of 0.5 sec after the timer TAON has timed out or after the completion of the lockup activation control.

If the necessity to terminate the lockup is found before the timer TLON times out during the lockup activation control, the solenoid SL4 is immediately turned off (or the duty cycle of 0%). When the need for a shift operation is found before the timer TLB times out, the solenoid SL4 is immediately turned off. When a need for a shift operation is found after the timer TLB has timed out, but before the timer TLON times out, the control mentioned under the next paragraph (13) is performed.

(13) Control of energization of the lockup control solenoid SL4 when a shift operation is to occur during the lockup Upon entering the TE interval for the control of an up shift, CPU in the control board 130 once decreases the duty cycle of the lockup activation solenoid SL4 and then increases it stepwise so that the duty cycle returns to 100% after the TE interval has passed, as shown in FIG. 14c, in order to allow shift shocks to be accommodated for, to a certain degree, by the torque converter 1. Specifically, upon entering the TE interval, the duty cycle of the lockup activation solenoid SL4 is decreased to Dt2 which corresponds to the prevailing throttle valve opening $\theta$, and timer TLS (0.4 sec) is started. FIG. 14d graphically shows the relationship between the throttle valve opening $\theta$ and the duty cycle Dt2. When the timer TLS times out, a duty cycle Dt2 which corresponds to the prevailing throttle valve opening $\theta$ is again calculated (FIG. 14d), and the duty cycle of the solenoid SL4 is updated to this calculated value. Upon termination of the TE interval, the duty cycle of the solenoid SL4 is returned to 100%.

For a down shift, the solenoid SL4 is immediately turned off (or the duty cycle of 0%) upon entering the TE interval. Subsequently, the lockup is activated according to the paragraph (12).

(14) Lock-up control associated with a change in the shift lever position

When the brake switch 137 is turned on, meaning that the brake pedal has been depressed, or when the shift lever is changed to one of S, L, N, R or P position, the lockup is immediately terminated by turning the solenoid SL4 off.

When the shift lever is in its S position, the lockup is activated according to the lockup activation control mentioned under the paragraph (12), provided $No \geq 700$ rpm, the idling switch 139 being closed, meaning an idling condition, and $Ne < Nt$ are simultaneously satisfied. When the shift lever is changed from S position to a different range, when $No < 700$ rpm to prevail or when the idling switch 139 is opened (by opening the throttle valve), the lockup is immediately terminated by turning the solenoid SL4 off.

As described, CPU in the control board 130 writes 1 into register LSF when the shift lever position as detected by the switch 134 is in the L range and LS (1.5 speed range) command switch 131 is closed, indicating the presence of such command (7 - 11 - 12), and during the shift decision (14), 1.5 speed range is written into register range which is to be established next, and determines that there is a need for a shift operation (15) when the current speed range as represented by the content of the register PS differs from the 1.5 speed range stored in the register DS, followed by executing the shift operation from the current speed range which may be the first, the second, the third or the fourth speed range to the 1.5 speed range (FIGS. 12a, 12e, 12f or 12g).

Subsequently when the switch 131 is opened, meaning the absence of the command for the 1.5 speed range or when the shift lever is changed from L range to S or D range, the register LSF is cleared (7, 11 - 13), and during the shift decision (14), a particular speed range (range X) in the S or D range which corresponds to the current throttle valve opening $\theta$ and the rotational speed No of the wheel driving shaft is determined and is written into the register DS, thus performing a 1.5→X shift where X=1, 2, 3 or 4; see FIGS. 12b, 12c or 12d).

Subsequently, as long as the shift lever is in the D range, a shift operation occurs only between the first, the second, the third and the fourth speed range. When the shift lever is in the S range, the shift operation takes place between the first and the second speed range. If the switch 131 is open, indicating the absence of any command for the 1.5 speed range, only the first speed range is established in the L range. In these instances, the 1.5 speed range is not established.

As described, in accordance with the invention, during a 1.5→2 shift, after a gear ratio in the second range (the second speed range) is established in the second transmission (3) by the solenoid valves (SL1, SL2) in the second set, the first transmission (2) is changed when a deviation ($\Delta N = Nt - No \times 1.53$) of the rotational speed (No) of the output shaft (39) of the second transmission (3) multiplied by the gear ratio (1.53) in the second range (the second speed range) of the second transmission (3) reaches a given value (Gmap) for which the shift operation can be regarded as substantially completed, which corresponds to the rotational speed (No) of the output shaft (39) of the second transmission (3) of the throttle valve opening ($\theta$). In this maner, the completion of the shift operation in the second transmission (3) is substantially synchronized with the completion of the shift operation in the first transmission, thus realizing a shift operation which is substantially free from any shift shock. No added elements are required in the hydraulic circuit.

While a preferred embodiment of the invention has been illustrated and described, it is to be understood that there is no intention to limit the invention to the precise construction disclosed herein and that the right is reserved to all changes and modifications coming within the scope of the invention as defined in the appended claims.

What is claimed is:

1. An automatic transmission comprising:
   a torque converter having an input shaft coupled to the output shaft of an engine;
   a first transmission having an input shaft coupled to the output shaft of the torque converter for performing a shift to at least a gear ratio in a first range and a lower gear ratio in a second range;
   a second transmission having an input shaft coupled to the output shaft of the first transmission for performing a shift to a gear ratio in a first range and a lower gear ratio in the second range;
   a hydraulic circuit including a solenoid operated valve in a first set which establishes a gear ratio of the first transmission and a solenoid operated valve in a second set which establishes a gear ratio in the second transmission, the hydraulic circuit supplying oil pressures to the first and the second transmission for establishing a gear ratio which is determined by a combination of the open/closed conditions of the solenoid valves in the first and the second set;
   opening detecting means for detecting the opening of a throttle valve of the engine;
   detecting means for detecting the rotational speed of the output shaft of the second transmission;
   detecting means for detecting the rotational speed of the input shaft of the second transmission;
   and gear ratio control means operable during a shift operation from a speed range in which a gear ratio in the second range is established in the first transmission and a gear ratio in the first range is established in the second transmission to a condition in which a gear ratio in the first range is established in the first transmission and a gear ratio in the second range is established in the second transmission to activate the solenoid valve in the first set to establish a gear ratio in the first range in the first transmission after the solenoid valve in the second set is activated to establish a gear ratio in the second range in the second transmission, at a time when a deviation of said detected rotational speed of the output shaft of the second transmission multiplied by a gear ratio in the second range of the second transmission from said detected rotational speed of the input shaft of the second transmission becomes equal to or less than a given value which is determined by the rotational speed of the output shaft of the second transmission and the opening of the throttle valve.

2. A method for initiating shifting in a second transmission of an automatic transmission comprising the steps of:
   initiating shifting in a first transmission;
   detecting a first rotational speed of an input shaft of a second transmission;

detecting a second rotational speed of an output shaft of the second transmission;

initiating shifting in said second transmission when the difference between the first rotational speed and a product of the second rotational speed and a gear ratio is less than or equal to a predetermined number.

3. The method of claim 2 further comprising the step of:

calculating the predetermined number based on the second rotational speed and an opening value of a throttle valve.

* * * * *